US012028466B2

(12) United States Patent
Kravitz et al.

(10) Patent No.: US 12,028,466 B2
(45) Date of Patent: *Jul. 2, 2024

(54) USING PKI FOR SECURITY AND AUTHENTICATION OF CONTROL DEVICES AND THEIR DATA

(71) Applicant: T-CENTRAL, INC., Dover, DE (US)

(72) Inventors: David William Kravitz, San Jose, CA (US); Donald Houston Graham, III, Pasadena, CA (US); Josselyn Lee Boudett, Clearwater, FL (US); Russell S. Dietz, San Jose, CA (US); James Jones, Tempe, AZ (US); Jamie Lynn Juarez, Glendora, CA (US)

(73) Assignee: T-CENTRAL, INC., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,022

(22) Filed: Jul. 19, 2023

(65) Prior Publication Data

US 2023/0421393 A1 Dec. 28, 2023

Related U.S. Application Data

(60) Continuation of application No. 17/896,992, filed on Aug. 26, 2022, now Pat. No. 11,743,057, which is a
(Continued)

(51) Int. Cl.
*H04L 9/32* (2006.01)
*H04L 9/08* (2006.01)
(Continued)

(52) U.S. Cl.
CPC .......... *H04L 9/3268* (2013.01); *H04L 9/0819* (2013.01); *H04L 9/3255* (2013.01);
(Continued)

(58) Field of Classification Search
CPC ... H04L 9/3268; H04L 9/0819; H04L 9/3255; H04L 63/0823; H04L 63/0876; H04L 63/10; H04W 12/06; H04W 12/08
See application file for complete search history.

(56) References Cited

U.S. PATENT DOCUMENTS 6,978,364 B1 * 12/2005 Balaz ............... H04L 63/0823
                                                        713/153
7,085,365 B2    8/2006 Kauppinen
(Continued)

FOREIGN PATENT DOCUMENTS

CN          105791272 A         7/2016

OTHER PUBLICATIONS

Considerations for CICS Web Services Performance, IBM, 372 pages, May 2009 (Year: 2009).*
(Continued)

*Primary Examiner* — Oleg Korsak
(74) *Attorney, Agent, or Firm* — LEWIS ROCA ROTHGERBER CHRISTIE LLP

(57) ABSTRACT

Method for utilizing a communication line certificate corresponding to a first device and a second device for a communication line, each of the first and second devices including a hardware processor and associated memory includes: creating a unique ID, by a third electronic device; transmitting the unique ID to the first generating a digitally signed request by the first device, wherein the digitally signed request comprises a first proof of an association of the first device to the communication line; transmitting the digitally signed request to the second device; verifying the first proof by the second device to produce a first verification of the association of the first device to the communication line; and generating a digitally signed acceptance by the second device, wherein the digitally signed acceptance com-
(Continued)

prises a second proof of an association of the second device to the communication line.

13 Claims, 13 Drawing Sheets

Related U.S. Application Data continuation of application No. 16/872,112, filed on May 11, 2020, now Pat. No. 11,456,882, which is a continuation-in-part of application No. 16/236,124, filed on Dec. 28, 2018, now Pat. No. 10,652,031, which is a continuation-in-part of application No. 15/890,140, filed on Feb. 6, 2018, now Pat. No. 10,333,720, which is a division of application No. 15/686,076, filed on Aug. 24, 2017, now Pat. No. 10,153,908, which is a continuation-in-part of application No. 15/621,982, filed on Jun. 13, 2017, now Pat. No. 9,832,026, which is a continuation of application No. 15/469,244, filed on Mar. 24, 2017, now Pat. No. 9,716,595, which is a continuation-in-part of application No. 15/409,427, filed on Jan. 18, 2017, now abandoned, and a continuation-in-part of application No. 15/269,832, filed on Sep. 19, 2016, now abandoned, said application No. 15/409,427 is a continuation of application No. 15/154,861, filed on May 13, 2016, now Pat. No. 9,578,035, said application No. 15/269,832 is a continuation of application No. 15/002,225, filed on Jan. 20, 2016, now Pat. No. 9,455,978, said application No. 15/154,861 is a continuation of application No. 14/715,588, filed on May 18, 2015, now Pat. No. 9,356,916, which is a continuation-in-part of application No. 14/218,897, filed on Mar. 18, 2014, now Pat. No. 9,270,663, said application No. 15/002,225 is a continuation-in-part of application No. 13/481,553, filed on May 25, 2012, now abandoned, said application No. 15/154,861 is a continuation-in-part of application No. 13/481,553, filed on May 25, 2012, now abandoned, said application No. 15/002,225 is a continuation-in-part of application No. 13/096,764, filed on Apr. 28, 2011, now abandoned, said application No. 15/154,861 is a continuation-in-part of application No. 13/096,764, filed on Apr. 28, 2011, now abandoned.

(60) Provisional application No. 63/010,547, filed on Apr. 15, 2020, provisional application No. 62/994,801, filed on Mar. 25, 2020, provisional application No. 62/956,456, filed on Jan. 2, 2020, provisional application No. 62/846,737, filed on May 12, 2019, provisional application No. 62/777,104, filed on Dec. 8, 2018, provisional application No. 62/741,409, filed on Oct. 4, 2018, provisional application No. 62/718,724, filed on Aug. 14, 2018, provisional application No. 62/648,945, filed on Mar. 28, 2018, provisional application No. 62/644,470, filed on Mar. 17, 2018, provisional application No. 62/611,527, filed on Dec. 28, 2017, provisional application No. 62/536,884, filed on Jul. 25, 2017, provisional application No. 62/401,150, filed on Sep. 28, 2016, provisional application No. 62/373,769, filed on Aug. 11, 2016, provisional application No. 62/369,722, filed on Aug. 1, 2016, provisional application No. 62/347,822, filed on Jun. 9, 2016, provisional application No. 62/330,839, filed on May 2, 2016, provisional application No. 62/326,812, filed on Apr. 24, 2016, provisional application No. 62/313,124, filed on Mar. 25, 2016, provisional application No. 62/133,371, filed on Mar. 15, 2015, provisional application No. 61/994,885, filed on May 17, 2014, provisional application No. 61/792,927, filed on Mar. 15, 2013, provisional application No. 61/650,866, filed on May 23, 2012, provisional application No. 61/490,952, filed on May 27, 2011, provisional application No. 61/416,629, filed on Nov. 23, 2010, provisional application No. 61/367,576, filed on Jul. 26, 2010, provisional application No. 61/367,574, filed on Jul. 26, 2010, provisional application No. 61/330,226, filed on Apr. 30, 2010.

(51) Int. Cl.
*H04L 9/40* (2022.01)
*H04W 12/06* (2021.01)
*H04W 12/08* (2021.01)
*H04W 12/71* (2021.01)
*H04W 12/76* (2021.01)

(52) U.S. Cl.
CPC ...... *H04L 63/0823* (2013.01); *H04L 63/0876* (2013.01); *H04L 63/10* (2013.01); *H04W 12/06* (2013.01); *H04W 12/08* (2013.01); *H04L 2209/84* (2013.01); *H04W 12/71* (2021.01); *H04W 12/76* (2021.01)

(56) References Cited

U.S. PATENT DOCUMENTS

| | | |
|---|---|---|
| 7,263,611 B2 | 8/2007 | Itkis |
| 7,660,831 B2 | 2/2010 | Freedman |
| 7,725,732 B1 | 5/2010 | Ballard |
| 7,805,403 B2 | 9/2010 | Freedman |
| 8,520,695 B1 | 8/2013 | Rubin et al. |
| 8,656,484 B2 | 2/2014 | Barton et al. |
| 8,861,354 B2 | 10/2014 | Luna et al. |
| 9,026,789 B2 | 5/2015 | Brown et al. |
| 9,094,407 B1 | 7/2015 | Matthieu et al. |
| 9,270,663 B1 | 2/2016 | Kravits et al. |
| 9,455,978 B2 | 9/2016 | Kravits et al. |
| 9,838,204 B2 | 12/2017 | Schultz et al. |
| 9,900,305 B2 | 2/2018 | Levergood et al. |
| 10,083,291 B2 | 9/2018 | James et al. |
| 10,534,920 B2 | 1/2020 | Schnjakin et al. |
| 10,594,702 B2 | 3/2020 | Mciver et al. |
| 10,757,573 B2 | 8/2020 | Guertler et al. |
| 10,778,659 B2 | 9/2020 | Tola et al. |
| 10,824,702 B1 | 11/2020 | Shahidzadeh et al. |
| 11,743,057 B2* | 8/2023 | Kravitz ............... H04L 63/0876 713/171 |
| 2003/0063735 A1 | 4/2003 | Brockenbrough et al. |
| 2005/0232406 A1 | 10/2005 | Kauppinen |
| 2007/0050618 A1 | 3/2007 | Roux et al. |
| 2007/0104180 A1 | 5/2007 | Aizu et al. |
| 2007/0143629 A1 | 6/2007 | Hardjono et al. |
| 2008/0155644 A1 | 6/2008 | Baranov et al. |
| 2010/0262308 A1 | 10/2010 | Anderson et al. |
| 2011/0085470 A1 | 4/2011 | Park et al. |
| 2012/0233665 A1 | 9/2012 | Ranganthan et al. |
| 2012/0311686 A1 | 12/2012 | Medina et al. |
| 2013/0244614 A1 | 9/2013 | Santamaria et al. |
| 2014/0241354 A1 | 8/2014 | Shuman et al. |
| 2015/0052066 A1 | 2/2015 | Vincent et al. |
| 2015/0222621 A1 | 8/2015 | Baum et al. |
| 2015/0334554 A1 | 11/2015 | Song et al. |
| 2016/0087933 A1 | 3/2016 | Johnson et al. |
| 2016/0098730 A1 | 4/2016 | Feeney |
| 2016/0253651 A1 | 9/2016 | Park et al. |
| 2018/0091489 A1 | 3/2018 | Biggs et al. |
| 2018/0167208 A1 | 6/2018 | Le Saint et al. |

(56) References Cited

U.S. PATENT DOCUMENTS

| | | |
|---|---|---|
| 2018/0294956 A1 | 10/2018 | O'Brien et al. |
| 2018/0323977 A1 | 11/2018 | Hojsik et al. |
| 2019/0005470 A1 | 1/2019 | Uhr et al. |
| 2019/0050854 A1 | 2/2019 | Yang et al. |
| 2020/0322348 A1 | 10/2020 | Kathai et al. |
| 2020/0358619 A1 | 11/2020 | Ding et al. |
| 2021/0160050 A1 | 5/2021 | Moon et al. |

OTHER PUBLICATIONS

International Search Report, Transmittal, and Recordation of Search History (12 pages) and Written Opinion (6 pages) for related International Patent Application No. PCT/US17/24112 filed Mar. 24, 2017.
Extended European Search Report dated Oct. 18, 2019 for corresponding European patent application No. 17771273.4 (9 pages).
DoD Implementation Guide for CAC Next Generation (NG), version 2.6, 2006, 56 pages; (Year: 2006).
Adams et al. RFC3161, 2001, 26 pages (Year: 2001).
Evered et al. (Android* Devices in a BYOD Environment, Oct. 2013, 6 pages) (Year: 2013).
Nakamoto (Bitcoin: A Peer-to-Peer Electronic Cash System, 2008, 9 pages) (Year: 2008).
Szabo (Formalizing and Securing Relationships on Public Networks, First Monday, 2(9), 1997, 21 pages) (Year: 1997).

* cited by examiner

USING PKI FOR SECURITY AND AUTHENTICATION OF CONTROL DEVICES AND THEIR DATA

CROSS-REFERENCE TO RELATED APPLICATIONS

This patent application is a continuation of U.S. patent application Ser. No. 17/896,992, filed Aug. 26, 2022, which is a continuation of U.S. patent application Ser. No. 16/872,112, filed May 11, 2020, which claims the benefits of U.S. Provisional Patent Application Ser. Nos. 62/846,737, filed on May 12, 2019; 62/956,456, filed on Jan. 2, 2020; 62/994,801, filed on Mar. 25, 2020; and 63/010,547 filed on Apr. 15, 2020; the entire contents of which are hereby expressly incorporated by reference.

Said U.S. patent application Ser. No. 16/872,112 is also a continuation-in-part of U.S. patent application Ser. No. 16/236,124, filed on Dec. 28, 2018, which claims the benefits of U.S. Provisional Patent Application Ser. Nos. 62/611,527, filed on Dec. 28, 2017; 62/644,470, filed on Mar. 17, 2018; 62/648,945, filed on Mar. 28, 2018; 62/718,724, filed on Aug. 14, 2018; 62/741,409, filed on Oct. 4, 2018; and 62/777,104 filed on Dec. 8, 2018; the entire contents of which are hereby expressly incorporated by reference.

Said U.S. patent application Ser. No. 16/236,124 is a continuation-in-part of U.S. patent application Ser. No. 15/890,140 filed on Feb. 6, 2018, which is a divisional of U.S. patent application Ser. No. 15/686,076 filed on Aug. 24, 2017, which is a continuation-in-part of U.S. patent application Ser. No. 15/621,982 filed on Jun. 13, 2017 and claims the benefit and the priority to U.S. Provisional Patent Application No. 62/536,884 filed on Jul. 2017. U.S. patent application Ser. No. 16/236,124 is also a continuation-in-part of U.S. patent application Ser. No. 15/890,140 filed on Feb. 6, 2018, which is a divisional of U.S. patent application Ser. No. 15/686,076 filed on Aug. 24, 2017, which is a continuation-in-part of U.S. patent application Ser. No. 15/621,982 filed on Jun. 13, 2017 and claims the benefit and the priority to U.S. Provisional Patent Application No. 62/536,884 filed on Jul. 2017.

Said U.S. patent application Ser. No. 15/621,982 is a continuation of U.S. patent application Ser. No. 15/469,244 filed Mar. 24, 2017 (now issued as U.S. Pat. No. 9,716,595), which claims the benefit of U.S. Provisional Patent Application Nos. 62/313,124 filed Mar. 25, 2016; 62/326,812 filed Apr. 24, 2016; 62/330,839 filed May 2, 2016; 62/347,822 filed Jun. 9, 2016; 62/369,722 filed Aug. 1, 2016; 62/373,769 filed Aug. 11, 2016; and 62/401,150 filed Sep. 28, 2016; which is a continuation-in-part of U.S. patent application Ser. No. 15/269,832 filed Sep. 19, 2016; and said U.S. patent application Ser. No. 15/269,832 is a continuation of U.S. patent application Ser. No. 15/002,225 filed Jan. 20, 2016 (now issued as U.S. Pat. No. 9,455,978) and said U.S. patent application Ser. No. 15/002,225 is a continuation of U.S. patent application Ser. No. 14/218,897 filed Mar. 18, 2014 (now issued as U.S. Pat. No. 9,270,663) and said U.S. patent application Ser. No. 14/218,897 claims the benefit of U.S. Provisional Patent Application No. 61/792,927 filed Mar. 15, 2013. U.S. patent application Ser. No. 15/002,225 is also a continuation-in-part of U.S. patent application Ser. No. 13/481,553 filed May 25, 2012, which claims the benefit of U.S. Provisional Patent Application Nos. 61/650,866 filed May 23, 2012 and 61/490,952 filed May 27, 2011.

Said U.S. patent application Ser. No. 15/002,225 is also a continuation-in-part of U.S. patent application Ser. No. 13/096,764 filed Apr. 28, 2011, which claims the benefit of U.S. Provisional Patent Application Nos. 61/416,629 filed Nov. 23, 2010; 61/367,576 filed Jul. 26, 2010; 61/367,574 filed Jul. 26, 2010; and 61/330,226 filed Apr. 30, 2010.

Said U.S. patent application Ser. No. 15/469,244 is a continuation-in-part of U.S. patent application Ser. No. 15/409,427 filed Jan. 18, 2017, which is a continuation of U.S. patent application Ser. No. 15/154,861 filed May 13, 2016 (now issued as U.S. Pat. No. 9,578,035), and said U.S. patent application Ser. No. 15/154,861 is a continuation of U.S. patent application Ser. No. 14/715,588 filed May 18, 2015 (now issued as U.S. Pat. No. 9,356,916), which claims the benefit of U.S. Provisional Patent Application Nos. 62/133,371 filed Mar. 15, 2015; 61/994,885 filed May 17, 2014; and 61/367,576 filed Jul. 26, 2010. Said U.S. patent application Ser. No. 14/715,588 which is a continuation-in-part of Ser. No. 14/218,897 filed Mar. 18, 2014 (now issued as U.S. Pat. No. 9,270,663), which claims the benefit of 61/792,927 filed Mar. 15, 2013. Said U.S. patent application Ser. No. 15/154,861 filed May 13, 2016 is a continuation-in-part of U.S. patent application Ser. No. 13/481,553 filed May 25, 2012, which claims the benefit of U.S. Provisional Patent Application Nos. 61/650,866 filed May 23, 2012 and 61/490,952 filed May 27, 2011.

Said U.S. patent application Ser. No. 15/154,861 filed May 13, 2016 is a continuation-in-part of U.S. patent application Ser. No. 13/096,764 filed Apr. 28, 2011, which claims the benefit of U.S. Provisional Patent Application Nos. 61/416,629 filed Nov. 23, 2010; 61/367,574 filed Jul. 26, 2010; and 61/330,226 filed Apr. 30, 2010. The entire contents of all of the above-identified applications are hereby expressly incorporated herein by reference.

FIELD OF THE INVENTION

The disclosed invention generally relates to security and authentication of electronic devices and their data, and more specifically using Public Key Infrastructure (PKI) for security and authentication of electronic devices and their data.

BACKGROUND

As security technology has evolved in recent years to support Internet of Things (IoT) devices. These devices may be served by having a device root of trust, preferably with integrated capabilities to support cryptography and related actions.

Generally, security, management and other challenges are preferably addressed when creating products and solutions whose components include IoT devices. Protecting, controlling and managing IoT devices can be challenging and fraught with danger, risk and potential liability. Manufactured products that incorporate IoT devices within them, generally increase product risks and management challenges by such component IoT devices.

Manufactured products (e.g., an automobile, medical device, etc.) along with their component IoT devices, typically should do many things. For one, products should ensure control over the data that is produced. This may include the protection of data as well as its transmission and communication.

Traditional computer security typically relies on firewalls that generally create a protective wall around a computer, electronic device, groups of each as well as others. Traditional reliance on perimeter defense is generally inadequate or insufficient when it comes to IoT devices as IoT frequently are expected to perform in areas beyond typical network protection as well as sometime in an area of weal or non-existent network protection. In our modern digital world, as intelligent things (e.g., IoT devices) begin to proliferate, a shift from general "stand-alone intelligent things" to a more expected "collaborative intelligent things" model should require an enhanced approach to security. In the collaborative model, multiple devices may work together, either independently of people or with human input and with this security breaches and hacking opportunities are increased.

Accordingly, it is desirable for the manufactured products to include robust access control so that unauthorized parties are unable to gain access to the device or its data. It is also desirable for the manufacturers to have a capability to instruct each device to only listen to or communicate with authorized endpoints (for example, other IoT devices) to reduce risks associated with endpoint spoofing, man-in-the-middle and/or other security violations or attacks prevented. It is also desirable for such devices to provide strong identity management, not only for most IoT devices within a product (which may incorporate multiple devices), but also, from a product as a whole to external, authorized endpoints. Each device or product should preferably be configurable as well as easily updatable only with authorized and signed firmware.

SUMMARY

In some embodiments, the disclosed invention provides a robust access control for controlled devices, such as IoT devices by providing strong identity management for IoT devices and products that include such devices, by using PKI for security and authentication of such devices, products and the data they produce.

In some embodiments, the disclosed invention is a method for utilizing a communication line certificate corresponding to a first device and a second device for a communication line, each of the first and second devices including a hardware processor and associated memory, the method including: generating a digitally signed request by the first device, wherein the digitally signed request comprises a first proof of an association of the first device to the communication line; transmitting the digitally signed request to the second device; verifying the first proof by the second device to produce a first verification of the association of the first device to the communication line; and generating a digitally signed acceptance by the second device, wherein the digitally signed acceptance comprises a second proof of an association of the second device to the communication line.

In some embodiments, the disclosed invention is a system for establishing secure communication between a plurality of devices coupled to a communication network, each device including a hardware processor and associated memory. The system includes: a first device for inviting, via an invitation transmitted over the communication network, a second device to securely communicate with the first device; a second device for receiving the invitation via the communication network, and transmitting a digital identity token over the communication network, wherein the first device receives the digital identity token via the communication network; a third-party device for authenticating a communication line between the first device and the second device and issuing a communication line certificate to establish a secure communication line between the first device and the second device.

The first electronic device and the second electronic device may be Internet of Things (IoT) devices and may be components of an automobile, an oil pump, a household appliance, an aircraft, a medical device, an electrical grid, a smart city, or a military weapon or system.

BRIEF DESCRIPTION OF THE DRAWINGS

These and other features, aspects, and advantages of the present invention will become better understood with regard to the following description, appended claims, and accompanying drawings.

DETAILED DESCRIPTION

Figure 1:
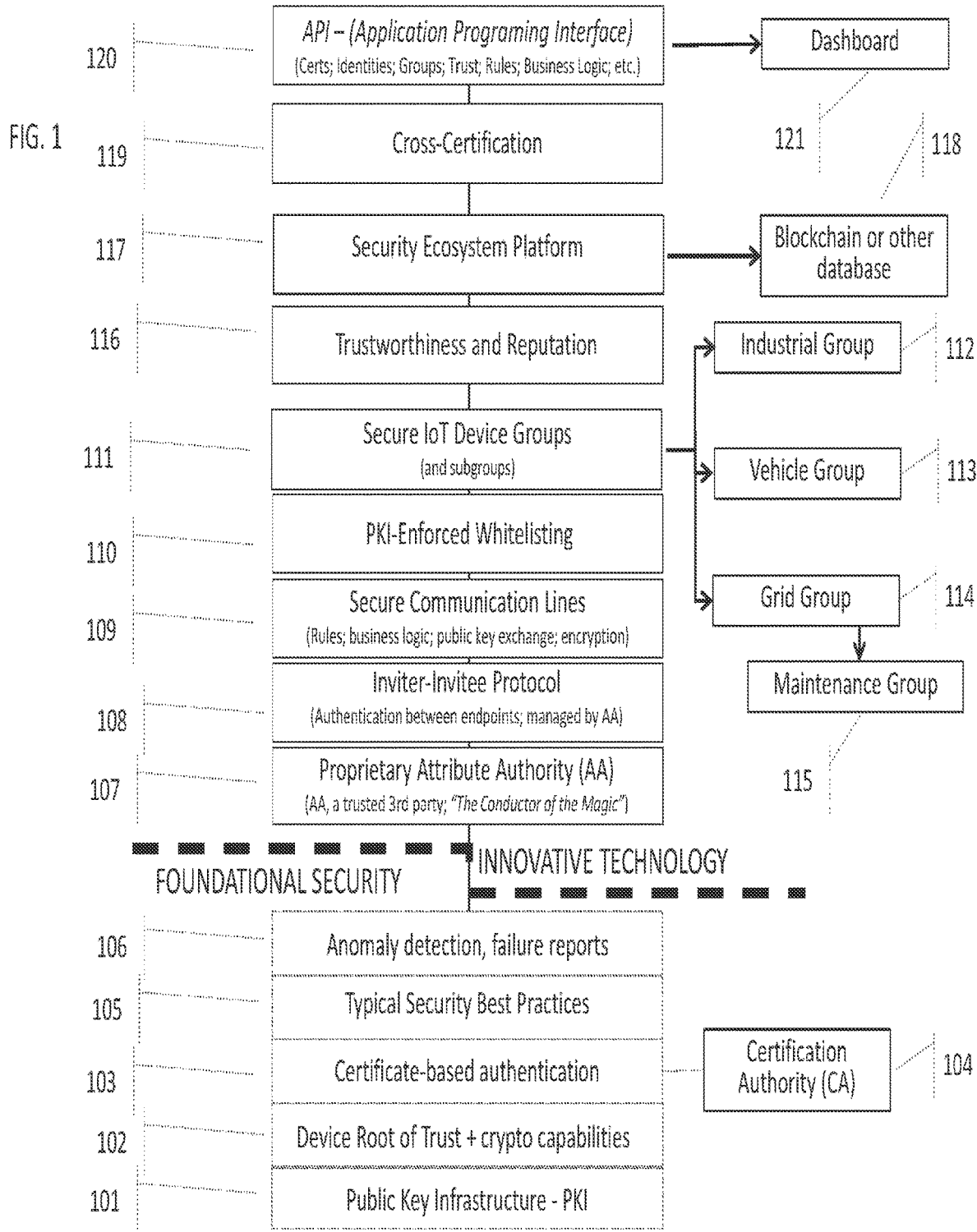
FIG. 1 is an exemplary process flow diagram of a trust stack, according to some embodiments of the disclosed invention.

FIG. 1 is an exemplary block diagram of a trust stack, according to some embodiments of the disclosed invention. Generally, in computing, a solution stack or software stack is a set of software subsystems or components needed to create a complete platform such that no additional software is needed to support applications. Applications typically run on or run on top of the resulting platform. For the purposes of the present disclosure and the security ecosystem described therein, solution stack as shown in FIG. 1, is called a "trust stack". The elements of a security ecosystem, particularly when use cases may involve Internet of Things (IoT) devices, may generally be divided into two broad categories. One category may be referred to as "foundational security." This trust stack identifies both typical foundational security elements as well as typical non-foundational security ecosystem elements, according to some embodiments of the disclosed invention. IoT devices may include robots, meters, valves, pumps, motors, cameras, military weapons systems, electrical grid, specific components of larger systems such as, a steering control of a ship, a propulsion system of a motorized vehicle, and the like.

In some embodiments, the security ecosystem described herein utilizes foundational security that may be provided by others and is typically built upon (and leverages) Public Key Infrastructure 101 (PKI). For instance, PKI 101 may be provided through a cloud service, an enterprise, by the security ecosystem itself or other. Roots of trust 102 may be supported in various manners, such as through the injection of private keys (typically during the manufacturing process of a device) or with a physical unclonable function (PUF) root of trust or another method. Typically, a root of trust function includes various cryptographic capabilities needed to support various capabilities of the security ecosystem (for example, digital signing, encryption and others). For root certificate-based authentication 103 used in foundational security, a security ecosystem may use a Certification Authority (CA) 104 within a managed PKI or utilize the services of an external public CA.

Typical Security Best Practices 105 are generally considered to be an element of foundational security for IoT devices. This element may include components such as, secure boot, signed firmware updates, defense-in-depth and others. Another element of foundation security may include functions such, an anomaly detection (such as unexpected activities being evident on a device) and failure (such as a device not performing as expected) reports 106.

Building on the foundational security 101-106, a security ecosystem offers innovative technology 107-121 in order to enhance the capabilities of IoT devices designed to perform desirable capabilities. Many of these innovative technology elements typically depend upon and utilize an Attribute Authority (AA) 107 which may act as a trusted third party to manage and/or establish many of the security ecosystem features and benefits described in levels 108 to 119.

An Inviter-Invitee Protocol 108 processing may be used between a pair of IoT devices (or other endpoints) for creating secure communication lines 109. Throughout the present disclosure, the term "line" in "secure communication line refers to a secure relationship between the relevant devices.

Inviter-Invitee processing typically utilizes elements of Foundational Security and preferably results in secure communication lines, a methodology that reduces man-in-the-middle attacks. Completion of Inviter-Invitee Protocol processing may include acceptance of a digital agreement(s) proffered by the inviter which become a component of a secure communication line 109. Inviter and Invitee Processing may also generate digital audit trails. Digital audit trails of events occurring at or by endpoints (for example, on a configurable basis) enhance data integrity through a security ecosystem's optional ability to provide authentication, reputation metrics, end-to-end audit trails and/or other benefits (which may also support trusted transaction records). One result of this standards-based system, enables non-repudiation of endpoint events and data to be adjudicated, generally trustworthy by external parties.

Secure communication lines 109 between IoT devices may include one or more of exchanging public keys, digital signing, encryption of digital assets, installing operating rules, business logic, device operating code and/or structure into the operation of devices as well as the relationship between those IoT devices (more simple rules may be useful for limited resource IoT devices to follow with more complex rules being useful for more robustly resourced IoT devices). Complex rules may include firmware or software code that provides actions for a device to follow and/or incorporate the actions into its operations. For example, a rule may instruct a device to accept additional rules and/or instructions from (and digitally signed by) a trusted source, e.g., an endpoint identified by its public key, digital identity token, certificate or other entities.

In some embodiments, through the use of secure communication lines with their described capabilities, through rules, business logic, code typically in the form of a binary file (or other record), etc., and/or possibly through the use of secure IoT device groups (described herein) and/or subgroup technology, a device may come to trust what other devices it may or should talk to. By controlling or directing IoT device behavior using such techniques, such procedures are expected to typically assist devices to help keep themselves and/or their data secure.

In some embodiments, secure communication lines 109 and associated rules enable devices to talk only to previously authenticated devices and no other devices or endpoints, referred to as PKI-Enforced Whitelisting 110. Rules, business logic, device code, etc. are delivered to IoT devices via incorporation into a PKI or attribute certificate, accompanied by a PKI or attribute certificate, digitally signed binary file, or other means. PKI-Enforced Whitelisting 110 may be established for supported device(s) under which device(s) follow rules and talk only as directed to previously authenticated devices and no other devices and thus supporting enhanced device security, anti-spoofing, and/or anti-hacking.

The security ecosystem may further include secure IoT device groups and subgroups 111. Groups may be created by associating previously authenticated devices and/or other endpoints into groups and memorializing the creation of a group through the issuance of an attribute certificate arranged through the actions of an attribute authority in conjunction with a PKI and/or a Privilege Management Infrastructure (PMI). In some embodiments, groups and subgroups of groups and/or other subgroups may be utilized for various purposes, for example, a single production line in a manufacturing plant 112; the devices in a manufactured product (e.g., vehicle 113, medical equipment, machine, etc.); or grouped devices (e.g., by type, features, location, etc.) within an electrical grid group 114; street lights and/or traffic lights in a geographic area(s).

In some embodiments, a maintenance group 115, composed of one or more endpoints (typically a computer, tablet or other smart devices), each operated by qualified for instance maintenance personnel, is created in order to provide authorized maintenance to one or more IoT (or other) devices or group(s) of devices to be maintained (e.g. a vehicle 113, production line 112, electrical grid 114 or other). In some embodiments, device(s) and/or other endpoint(s) that are members of a group to be maintained (for example, in an automobile) may be pre-provisioned by an attribute authority with a trusted attribute (or other) certificate for such a trusted maintenance group that preferably would identify to such automobile IoT (or other) device a maintenance group endpoint seeking access to it could be authenticated as a member of a trusted maintenance group that such an vehicle device(s) to be maintained, should trust. When such a managed device is contacted later by an external endpoint claiming to be a maintenance group member, the device is able to authenticate (for example directly with an attribute authority of a security ecosystem, relying on stored certificates, or other method) that such an external device is a valid, trusted member of a maintenance group (thus preferably enhancing device security, maintenance reliability, maintenance access, and other benefits).

By gaining trust through the authentication of an endpoint as a member of such a group-to-be-trusted, an IoT (or other) device to be accessed by the group-to-be-trusted is able to trust such a group-to-be-trusted endpoint that can authenticate (typically via an attribute authority or certificate or other method) as being a member of such a group-to-be-trusted (e.g., a maintenance group). Such an arrangement helps support the establishment of trusted maintenance of, security of, control over and/or other legitimate need, for products incorporating IoT devices that are produced by users of a security ecosystem. Trustworthiness and Reputation 116 of both endpoints/devices and their data may be tracked within a security ecosystem and scored as well.

A security ecosystem platform 117, may record designated and other events, records, certificates, etc., immutably on a blockchain or other databases. Recording the records on a block chain provides the advantage of decentralization of the data storage and control. For example, by storing data across its peer-to-peer network, the blockchain eliminates a number of risks that come with data being held centrally. The decentralized blockchain may use ad-hoc message passing and distributed networking. In some embodiments, the blockchain may be a Permissioned blockchain. Permissioned blockchains use an access control layer to govern who has access to the network. Moreover, the PKI of one security ecosystem may practice cross-certification 118 of certificates, identities, and/or other attributes with the PKI of another security ecosystem.

As shown in block 120, an Application Programming Interface (API) typically interfaces with a dashboard (user interface) 121. In some embodiments, the dashboard 121 includes controls and visualizations used by a user to interface with the security ecosystem platform 117. The API 120 also typically interfaces with the AA 107 regarding identities, groups, trusts rules, business logic and more.

Typically, elements of the trust stack of FIG. 1 are utilized so that provisioned devices benefit from (and provide benefits of) the security ecosystem to a user, customer, enterprise, government or others. When putting a device into service, a device must first be provisioned and typically registered. An initial step of being put into services would be a successful application of the Inviter-Invitee protocol, which typically results in an establishment of an authenticated relationship with another device thus creating a secure communication line. With such devices following rules that may be provided to them during the Inviter-Invitee protocol, improved operational security of such devices is achieved in a form such as PKI-Enforced Whitelisting. A provisioned device or provisioned endpoint typically includes a device with firmware to support the features of the security ecosystem, a device or endpoint identity, a unique ID, a root of trust, a public key, a device digital certificate and other capabilities as described.

A manufacturer (and/or service provider) may manufacture and/or sell a device incorporating such capabilities of the security ecosystem directly (or possibly through distributors) to end customers to enable such customer to collect data from IoT devices, Programmable Logic Controllers (PLC's) and/or other devices with the delivery of such data preferably being done in a secure manner. One result may be that a collection of strategically installed control devices could support the preferably secure delivery of data to a secure cloud platform (or other network facilities) where it may be used for analysis and action, such as in IoT data analytics (in one embodiment as a result of preferably machine learning and in another embodiment as a result of artificial intelligence).

Such analysis generate recommended, suggested or other actions, reports and/or other useful actions and may be made available to a customer or user's own cloud computing/storage or other computers for its purposes. Such analysis may also be securely delivered using the described trust control devices from a cloud or IT network to IoT devices or PLC's in order to preferably provide instructions to direct and/or enhance their operational performance. In some embodiments, a control device at the IoT device-PLC end is provisioned to support one-way communications to such devices, for example, by using one-way diodes. One-way communications could preferably enhance security and hamper a possible attack. When employing such embodiments, it may be desirable to have a second or separate pair of control devices (e.g., without the one-way communications limitations) that didn't reach as far as to systems supporting the previously described analysis and action capabilities in order to support more common reporting and management activities (for example as within a SCADA system).

Such Security Ecosystem system-supported secured, authenticated remote control devices preferably provide to enterprise customers (that have remote IoT devices, PLC's, etc. which generate data) the benefit of typically efficient, secure and reliable solution to retrieve and manage those data.

Figure 2:
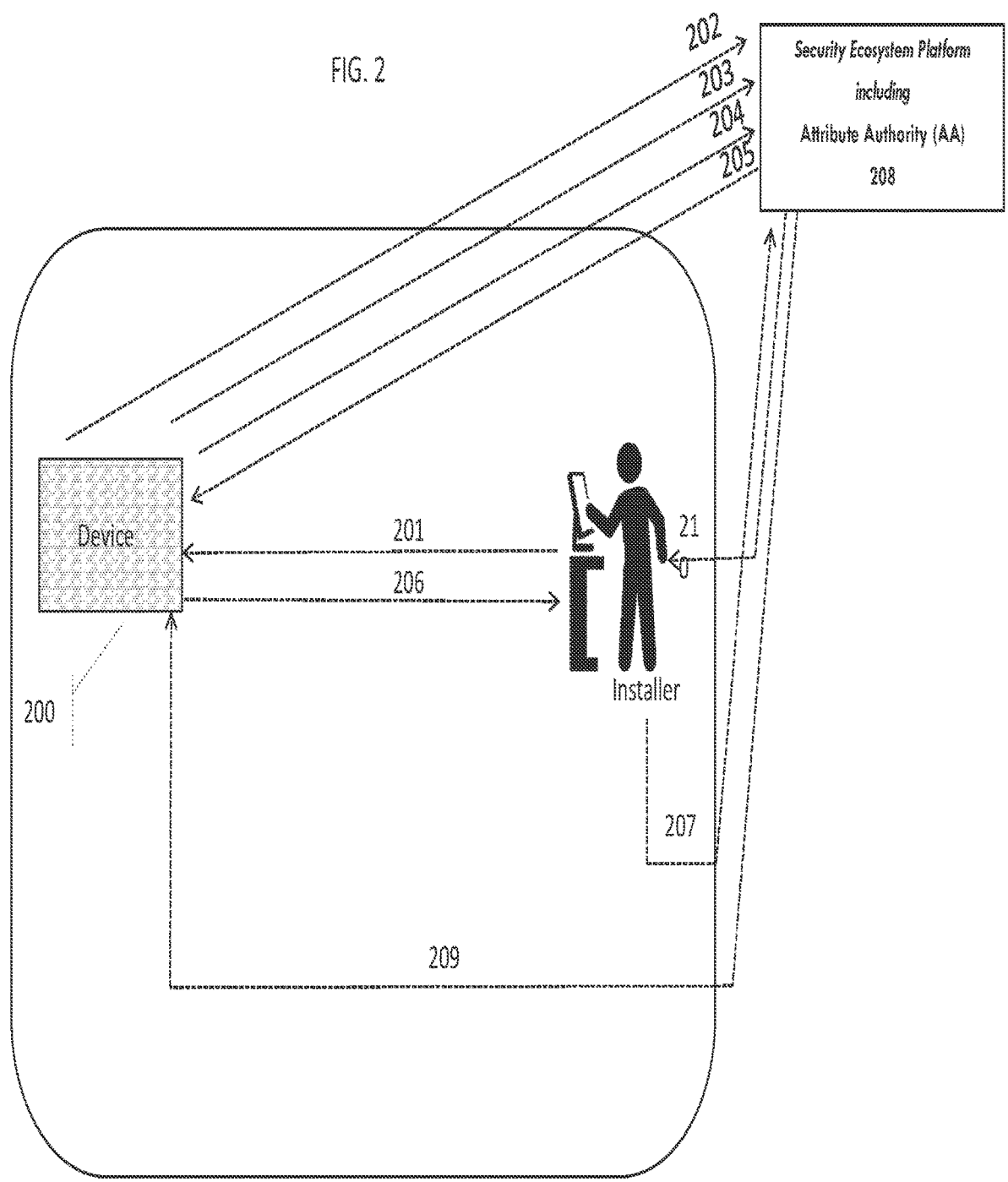
FIG. 2 is an exemplary process flow diagram for provisioning a device, according to some embodiments of the disclosed invention.

FIG. 2 is an exemplary process flow diagram for provisioning a device, according to some embodiments of the disclosed invention. Devices may be provisioned prior to their sale through distributors or others or directly. Provisioning typically provides for device authentication, which may be maintained and relied upon through a sales, registration, installation and/or operational process.

An installer may load a trust control device (TCD) or other device 200 with firmware typically including a software with an IP address of typically an Attribute Authority (AA) application on a security ecosystem platform 208. An identity is typically provided to a device (e.g., trust control device, etc.), as depicted by data communication 201 (e.g., generally from an installer). The device 200 then connects to a security ecosystem platform 208 that includes an AA and a Globally Unique Identifier (GUID) is assigned to the device, and then the device is registered. An unique root of trust ID (for example a generated PUF ID) is typically provided by a device (if not previously provided) as shown by 203 and is associated with the GUID by the AA. Subsequently, a unique root of trust ID (for example a generated PUF ID, typically a public key) is provided by device (if not previously provided) as depicted by 204 and is preferably associated with the GUID by the AA. A device certificate is then issued that typically includes GUID, device ID, and/or device public key and sent to the device 200, at 205. A Digital Identity Token (DIT) asserting the device's unique identity (e.g., a specific trust control device) which includes device's specs, claimed identity/role within a network and/or other installer provided information and its public key(s) is digitally signed by the device and provided at 206 to an installer or other designated endpoint.

At 207, DIT of the device 200, which is typically sent to Installer with Installer's (possibly non-digital) certification is then sent to AA at the ecosystem platform 208 (installer preferably has an app and it digitally signs the DIT), where the authentication of the device is processed with the DIT, and the device identity is verified and typically accepted by the AA. In some embodiments, the device is registered with a newly created attribute certificate provided via the AA.

The AA securely sends device attribute certificate together with public key certificates and/or attribute certificates of other devices and/or groups that the device should trust (e.g., a firmware signing authority; a maintenance group; and possibly others) to the device 200, as shown by 209. Device 200 may digitally sign such certificates as received to ensure their future trustworthiness. A copy of device's certificate is then sent to Installer 210.

Figure 3:
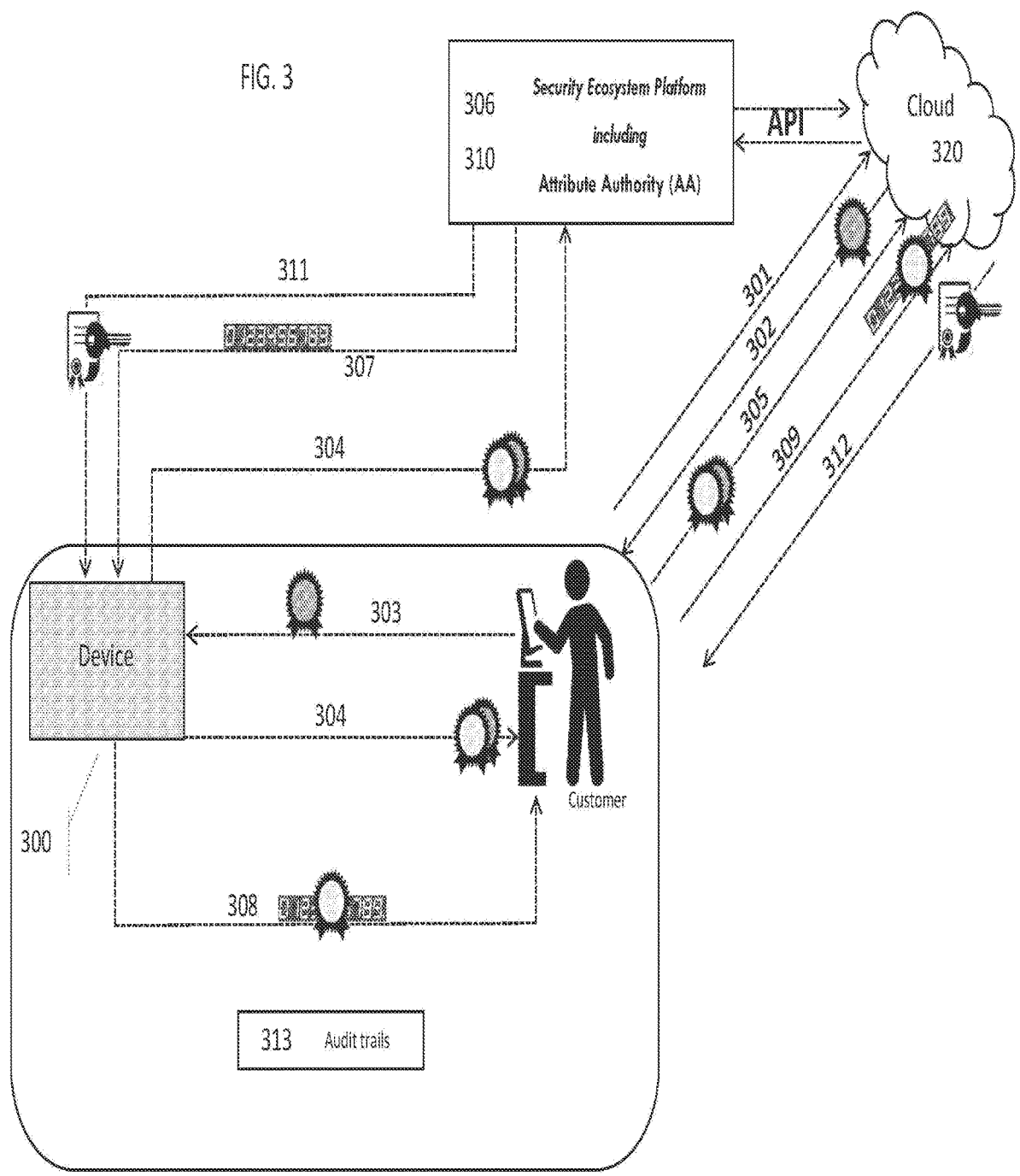
FIG. 3 is an exemplary process flow diagram for customer registration of a device, according to some embodiments of the disclosed invention.

FIG. 3 is an exemplary process flow diagram for customer registration of a device, such as a TCD or termination endpoint device, according to some embodiments of the disclosed invention. Typically, uniquely identified devices may become registered and associated with specific customers or other end users. Authorized, typical optional features may be selected and subscribed by a customer (or other end user) and subsequently be activated by a service provider for accurate monitoring of support devices and/or their services.

In some embodiments, using a browser connection, a customer registers a device 300 via a service provider browser portal to a cloud 320, as shown by 301. The browser portal may include customer selected, device specific options, such as: provider licensing service options selection matrix; groups and sub-groups for possible device-specific assignment; selection of rules, business logic that may be added to secure communication lines and/or attribute certificates; and more. The web portal provides the customer with device-specific setup token to the customer at 302. Using a second local browser window, customer connects to device 300 and uploads setup token to the device at 303. Device 300 then validates the setup token and replies with an acceptance token (or other acceptance indication) signed with its private key at 304.

Customer then sends device's signed acceptance token to an AA at the cloud 320 (the installer typically has app installed and digitally signs token) at 305. The AA then verifies signed token acceptance at 306. Also, out-of-band confirmation is performed with the AA sending a one-time-only unique ID (typically a nonce) to device at 307. Device 300 then signs an unique ID and provides the signed unique ID (e.g., encrypted) to customer for uploading to AA at 308. At 309, customer attests (optionally digitally) to device acceptance and uploads the signed unique ID to the AA. At 310 the AA reviews, verifies, and typically accepts the token, and issues an attribute (or other) certificate confirming device registration. At 311, the AA sends the device attribute certificate (incorporating device public key) to the device 300 and to customer via the web portal. The registration may also generate audit trails 313, based, in part, on digital signatures. In some embodiments, the customer function could be performed in a comparable manner by an artificial intelligence managed endpoint. A "customer" is one example of an installer. Other examples include "other end user", an "artificial intelligence managed endpoint", and other similar types of end points.

Figure 4:
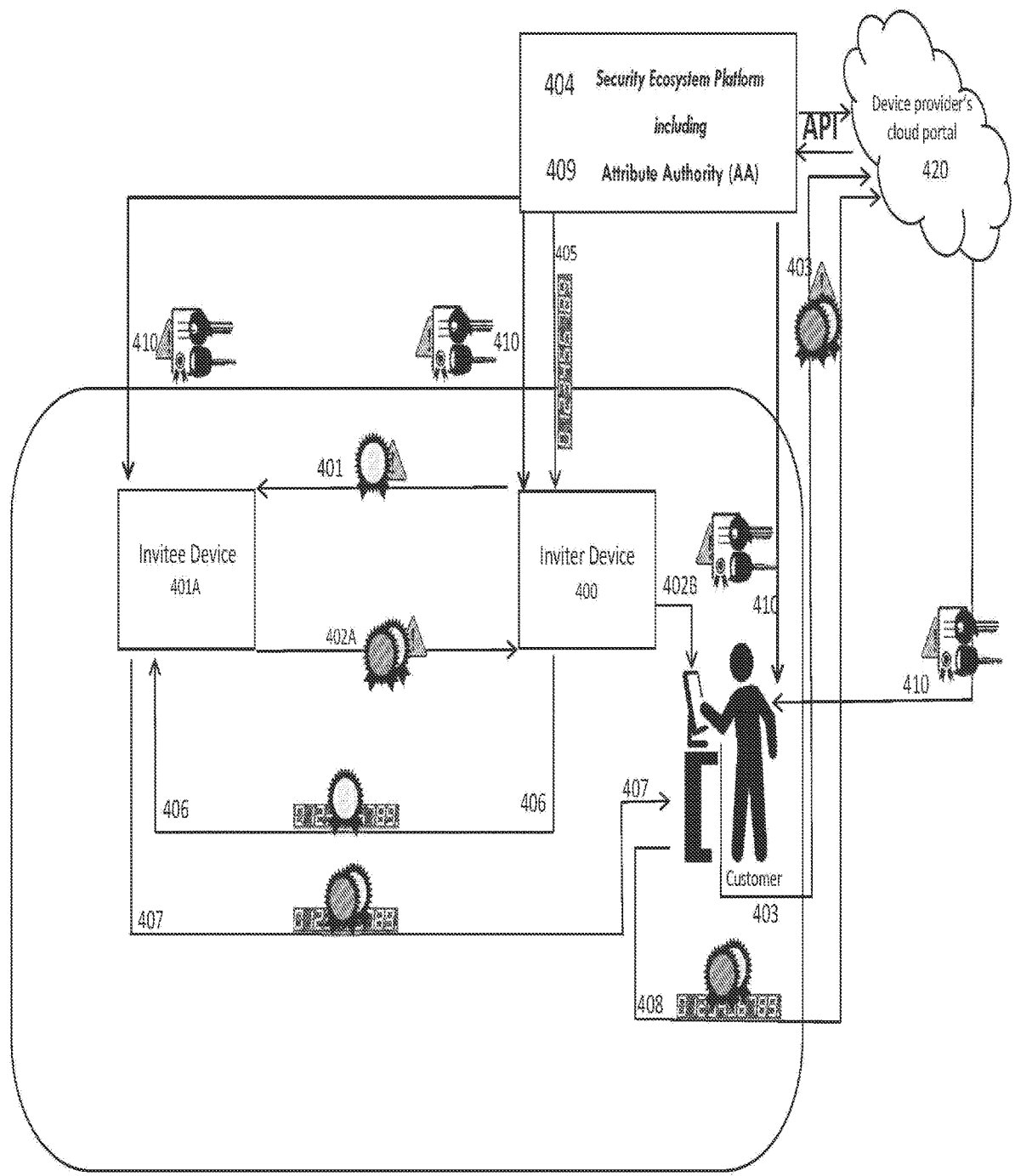
FIG. 4 is an exemplary process flow diagram for establishing a secure communication line between two endpoints, according to some embodiments of the disclosed invention.

FIG. 4 is an exemplary process flow diagram for establishing a secure communication line between two endpoints, according to some embodiments of the disclosed invention. The endpoints may be a trust control device (generally described with respect to FIG. 5) or an endpoint termination device (which is typically a less featured trust control device, for example, with less significant data collection capabilities, fewer ports, etc.), or another capable, provisioned device. In some embodiments, secure, authenticated, persistent communication lines may be established between each device and a cloud portal 420 (or with another device and or provisioned endpoint).

Inviter device 400 invites 401 (typically at customer direction) an invitee device 401A by sending its digital identity token (DIT) with signed request and optionally a proffered digital agreement to invitee device 401A to establish a communication line. Invitee device 401A typically accepts request and replies 402A, sending its DIT with agreement acceptance to invitee device 400. Inviter device 400 sends (402B) both DITs with invitee device's acceptance 402A (optionally, including an agreement) to customer (or other coordinating/supervising entity or authorized endpoint). Customer typically examines DITs, then optionally provides its certification of devices' agreement and sends DITs 403 to a cloud or network portal 420 and an AA 409 of a security ecosystem platform 404. Prior to sending 403, customer may configure or otherwise provide rules, business logic, etc. for the communication line between the two devices. The AA 404 runs a verification check on what it receives and then may accept the request for processing.

In some embodiments, for out-of-band confirmation, a third-party (device), for example, the AA sends a one-time-only unique ID (e.g., a nonce) to inviter device 400 shown by 405. Inviter device 400 then sends the unique ID 405 that it first digitally signs to the invitee device, shown by 406. Invitee device 401A typically accepts and digitally signs the previously signed unique ID and sends it (at 407) to the customer (or directly to the AA). Customer receives and examines IDs signed by both and then certifies completion of the protocol and uploads them a cloud or network portal 420 and to AA 408. AA typically reviews, verifies, accepts the request and issues an attribute (or other) certificate for the communication line with typically its associated agreement(s), rules, etc., at 409. AA sends such certificate for the communication line between the two devices to each device and customer at 410, confirming to the devices that a persistent, communication line (preferably including digital agreement and public key of each device) has been established between them. Such an example of inviter and invitee processing may generate audit trails based, in part, on digital signatures. Inviter device 400 typically proffers digital agreement(s), rules, business logic to Invitee device. Alternatively, the agreement may be mutually created or assigned by AA, customer, or other authorized entity.

In some embodiments, the customer may be removed, for example, 402A process may become 402 and 402B process may become a replacement of 403 process, where inviter device sends both DITs and acceptance of agreement to the AA. Also 407 process may change so that invitee device accepts and digitally signs the unique ID and sends it to AA. In some embodiments, the customer function is performed in a comparable manner by an artificial intelligence managed endpoint.

In some embodiments, a device identified as a peer-level device, such as one automobile informing another automobile of roadside conditions, may be trusted as providing credible data while typically only a device higher in a relevant hierarchy would be authorized to issue commands on how a recipient device should actuate or respond to conditions. The system may be configured to require a device to be even higher in the hierarchy in order to issue commands that result in a device reconfiguring or recalibrating its settings or functionality or to update or replace its pinned public keys such as those pertaining to attribute authorities.

For example, a command may have to be verified as having been issued by the same authority as that associated as the owner of the public key to be updated or replaced or by a distinct authority that has been clearly delegated by the authority with such permission (to address, say, the possibility that the original authority has lost access to one or more of its private keys). Consideration may also be given to vendor identities and relationships. For example, a control unit of automotive OEM-A may be constrained by OEM-B to not enable recalibration in general of its vehicles, but if OEM-A provides the hybrid technology used in OEM-B vehicles, a hierarchical level-appropriate command from OEM-A may be considered legitimate to manage hybrid components within a group of endpoints associated with OEM-B (a group is typically composed of one or more endpoints.)

Communication line and group relationships that are established through the issuance of an attribute certificate typically include rules and/or business logic to direct and/or manage the use of a communication line. Recalibration of relationships is typically performed by way of modifying, replacing or updating attribute certificates (as opposed to recalibration of devices) could be typically desirable under conditions where such relationships between endpoints, between endpoints and groups, and/or between groups and groups, may evolve over time.

In some embodiments, the disclosed invention extends the security capabilities of PKI- and PMI-systems to authenticated endpoints, devices, users, entities (in one embodiment, enterprise businesses, government, small business, individuals, social interest groups, and/or others, "Entities") and preferably protect content, records, identities as well as other elements associated with the activities described herein, for example, device, user, endpoint, TrustScores, identities, and other. Each group membership may be established through respective attribute certificates of respective user-controlled devices, which may include associated rules for group membership in the attribute certificate.

A group of users or entities of a security ecosystem who may share common interests in their lives, interests, activities, businesses, and/or goals that may be a focus of a particular security ecosystem are associated with a type of group referred to as a "Community". In some embodiments, a Community may be a social grouping or a profession/business grouping or other grouping of individual, groups, businesses, professionals or other groups with one or more shared interests, activities, etc.

Figure 5:
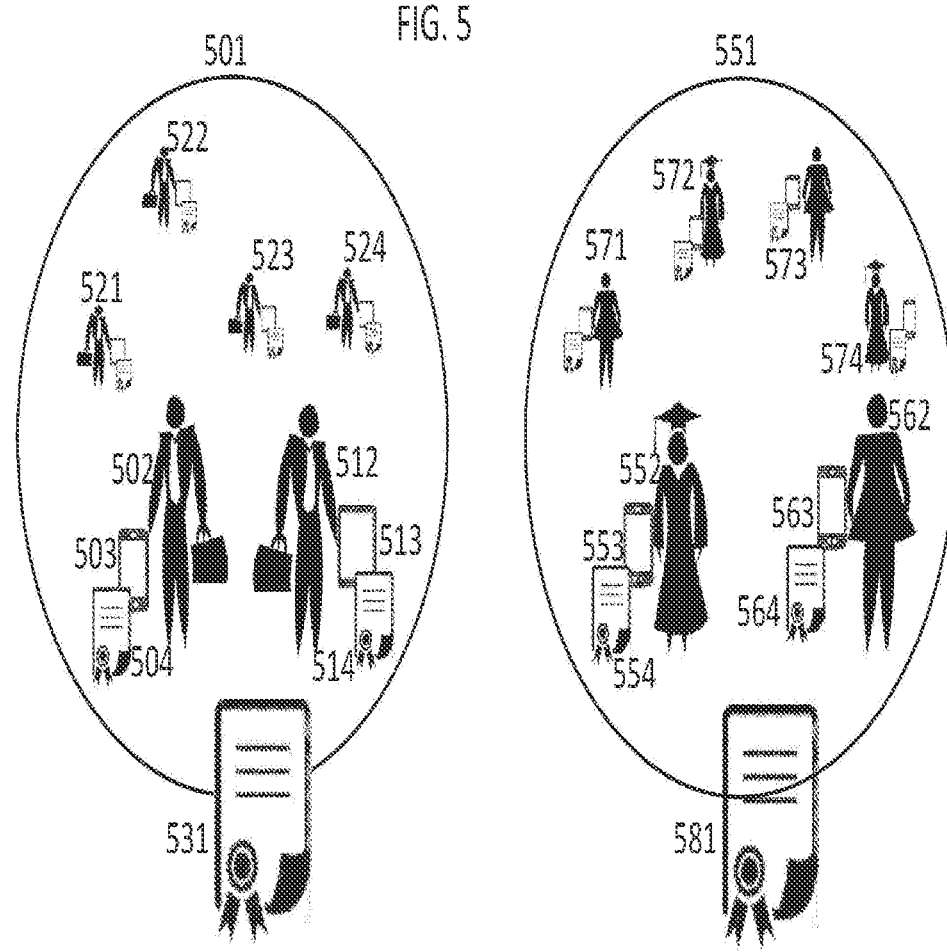
FIG. 5 shows a community and groups, according to some embodiments of the disclosed invention.

FIG. 5 shows a community and groups, according to some embodiments of the disclosed invention. As depicted, a community group 551 of people 552, 562, each of whom has a user-device 553, 563 with each of those having a certificate 554, 564, plus four additional people with devices with certificates 571, 572, 573 and 574, plus a certificate for the group 581. In some embodiment, a Community may have one or more focuses such as on examining history, historical or other records, legal case precedent, published journals, various activities, social activity, political activity, and/or one or more other topics. As shown in FIG. 5, another Community 501 of professionals 502, 512, each of whom has a user-device 503, 513 with each of those having a certificate 504, 514, plus four additional women with devices with certificates 521, 522, 523 and 524, plus a certificate for the group 531. A Community may be treated as a cryptographically-secured group through technology capabilities of a security ecosystem.

In some embodiments, the security ecosystem provides a) a capability to enable an entity to invite users or individuals to a secure communication line without typically exposing the entity Infrastructure; b) a function to allow an entity system administrator to track, monitor and/or audit transmitted encrypted digital content; c) a capability to preferably create a separate database of associates and affiliates, typically including the right to revoke any invitation or relationship; d) a capability for an entity to send encrypted digital content outside an entity firewall with a result being that such digital content may be secure; e) a capability to preferably integrate security ecosystem and/or API data records with Active Directory (or a similar system) as well with an entity's PKI (Public Key Infrastructure); f) a preferable reduction in "Data Spawn" (i.e., a tendency of unencrypted sensitive digital content to be copied and transferred to another person, entity and/or location and possibly copied and transferred repeatedly with a result being that the original sensitive digital content may become located in multiple places and/or with multiple individuals or entities, thus typically reducing its security) through the capabilities of the security ecosystem and API, where digital content may be transferred to multiple places and/or with multiple individuals or entities in a typically encrypted format and may be stored in an encrypted format, thus reducing an uncontrolled and/or un-audited distribution of unencrypted sensitive digital content.

In some embodiments, the security ecosystem and an API (directly or through entities) offer users a downloadable application to install on a desktop or mobile device or server or other user-controlled device that may "lock" (encrypt) and "unlock" (decrypt) digital content using a cryptographic standard such as Advanced Encryption Standards (AES 256) as well as other optional protocols. In some embodiments, user-controlled device supports authentication elements for mobile, tablet or other device similar to the secure enclave capabilities provided by companies, such as Apple™. In some embodiments, for other user-controlled devices (such as a computer) an authentication element may be supported through a Trusted Platform Module (TPM) or through the use of a chip with imbedded capabilities.

In some embodiments, digital signatures provide an integrated, persistent, capability between an entity and a user that are in support of facilitating the efficiency and reliability of remote document execution. In some embodiments, audit trails may provide an integrated digital, non-repudiable, verifiable audit trail capability confirming chain of custody, access, etc. of encrypted digital files, etc. which, in turn, may reduce fraud. In some embodiments, 2-factor authentication may provide an integrated, digital, 2-factor authentication capability to preferably enhance the reliability of remote authentication and approvals as compared to (for example) common SMS messaging techniques. Receiving a one-time-use code via SMS is a form of 2-factor authentication (2FA) when used in conjunction with, say, username and password login. However, unlike an authenticator installed on a device presumably in the hands of the intended user, SMS codes can potentially be hijacked in transit more easily than codes generated by an authenticator. In some embodiments, the use of two-factor authentication methods is added for a higher level of authentication.

In some embodiments, the security ecosystem may be centralized in a cloud, such as within the network domain of an enterprise. By accessing the capabilities of such a security ecosystem, a user may securely set up identities.

Figure 6:
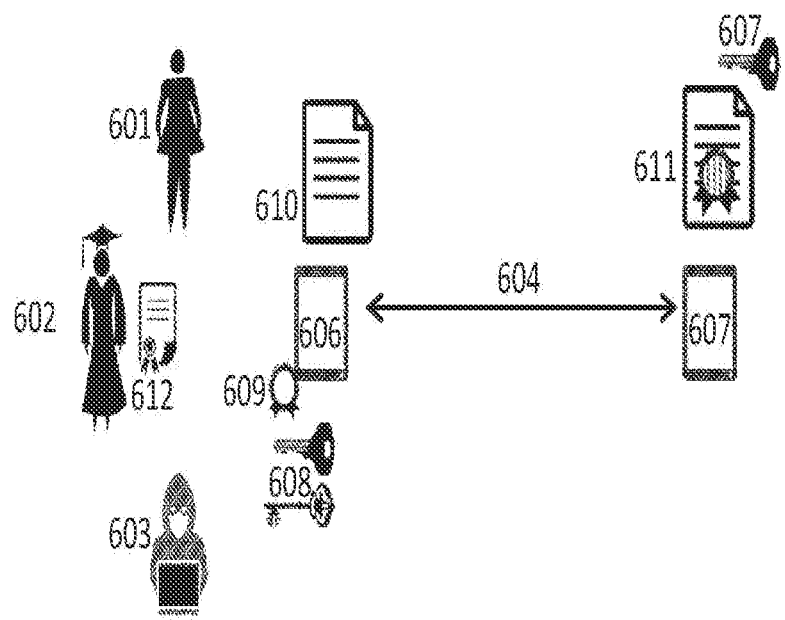
FIG. 6 shows a security ecosystem centralized in a cloud, according to some embodiments of the disclosed invention.

FIG. 6 shows a security ecosystem e centralized in a cloud, according to some embodiments of the disclosed invention. As illustrated, anonymous identities 601, 602 and 603 are associated to keys and authorized communication line 604, or connections between a user-controlled device, an entity, group, users and/or others) in order that the security ecosystem can address real-time credential management required to support the various actions described in this specification. The setup of authorized communication lines comprises of delegation of authorizations, as incorporated into an inviter-invitee process.

Real-time credential management may involve key establishment key pairs and/or encryption/decryption key pairs, as well as digital signature verification 607, and digital signature generation key pairs 608. These key establishment key pairs and/or encryption/decryption key pairs may be used, in turn, to deliver access to derived, transported and/or agreed-upon symmetric encryption/decryption keys so that plaintext content (e.g., digital records/content or files stored on a security ecosystem), and/or communications (e.g., messages) securely can be made available to intended recipients (e.g., Users) whether internal or external to an Entity's network or a security ecosystem. A given digital record, document, communication, message or other may have one or more digital signatures 609 generated. Such digital signatures 609 may be applied to plaintext 610 and/or ciphertext.

The content over which a digital signature is applied may include one or more previously applied digital signatures 611. Digital signatures, with or without timestamps, may be generated or applied by a security ecosystem (e.g., an Attribute Authority). Such security ecosystem/service provider-generated digital signatures may be in addition to or in lieu of digital signatures applied by a user or subscriber or member entity of the security ecosystem/service provider-mediated System. A live server may also play a role in setup, such as to hand off data to/from components of the PKI and/or PMI, where part(s) of such data may be opaque to the live server(s). The PKI may also play a role in escrow of keys. A given subscriber, user or member entity in control of a user-controlled device may have a plurality of identity profiles. An identity profile may be anonymous or may be public.

Identity profiles may be comprised or supported, at least in part, of attribute certificates 611. A public key referenced by an attribute certificate that is within an identity profile may or may not correspond to a private key that is owned by the owner of the attribute certificate. As an example, where the private key corresponding to the referenced public key is not owned by the owner of the attribute certificate, consider the case where an IT department of an entity maintains local access to one or more private keys, while attribute certificates may be issued to individual employees and/or groups of employees and/or departments and/or Users. If the owner of an attribute certificate does not have access to a private key corresponding to a public key or public key certificate referenced by the attribute certificate then it obviously cannot use such private key to prove ownership of the attribute certificate, e.g. by signing a relying-party-generated nonce.

In some embodiments, an attribute certificate owner is able to prove ownership in a secure way within a closed system where there is not a concern about a relying party reusing a proof of ownership with a different relying party. For example, an attribute certificate may include hash (hash (hash . . . (hash(value))) . . . ) for example, for an n-iterated hash of value where "value" is privately communicated to the intended owner of the attribute certificate. At the start of period 1, the attribute certificate owner discloses the n−1st hash of value; at the start of period 2, the attribute certificate owner discloses the n−2nd hash of value, and so on. A relying party can verify, e.g., by hashing the n−2nd hash twice, but cannot independently produce the n−3rd hash of value.

In some embodiments, the disclosed invention provides one or more APIs integrated with a security ecosystem service to provide access and use of one or more of the security ecosystem's features. An example of one such feature is to enable the extension of security credentials for entities, users, or endpoints in order to effectuate more secure communication and/or the sharing of digital documents, records including digital citations, references, relationships, etc., between an entity, community, user, endpoint and/or one or more remote third parties (e.g., from an enterprise entity to a User, another entity, a third-party customer beyond that enterprise entities' network firewall or other). The security ecosystem with its API(s) and/or Software Development Kit (SDK) may make it easier and simpler for software designers, application developers, Entities and others to add sophisticated cryptographic security solutions to their applications and/or Entity software solutions, and particularly considering the disclosures herein, for the sharing of organized, referenced digital records.

In some embodiments, users participate pseudonymously, anonymously and/or with a public identity. Users may control a device that supports technology required by the system (e.g., mobile devices, or computers with built in Trusted Computing Platforms (TPM's) and/or others). In some embodiments, group collaboration, encryption, digital signing, Trust-Scoring, which, together with identification capabilities of a security ecosystem may preferably identify and remove users or entities or others that may act in a troll-like manner and/or a user acting in an undesirable manner within a security ecosystem community, that may spread interpolative or disruptive communication, messages, digital records that a community of users may determine may be undesirable (e.g., through use of a Trust-Scoring system) and/or may attempt to join a community in the pretext of being aligned with a community's goals and purposes, but in fact may be covertly intending to (or actually be) acting in a manner(s) deemed anti-pathetic to such goals and purposes (sometimes described as being a "plant" or "spy").

Figure 7:
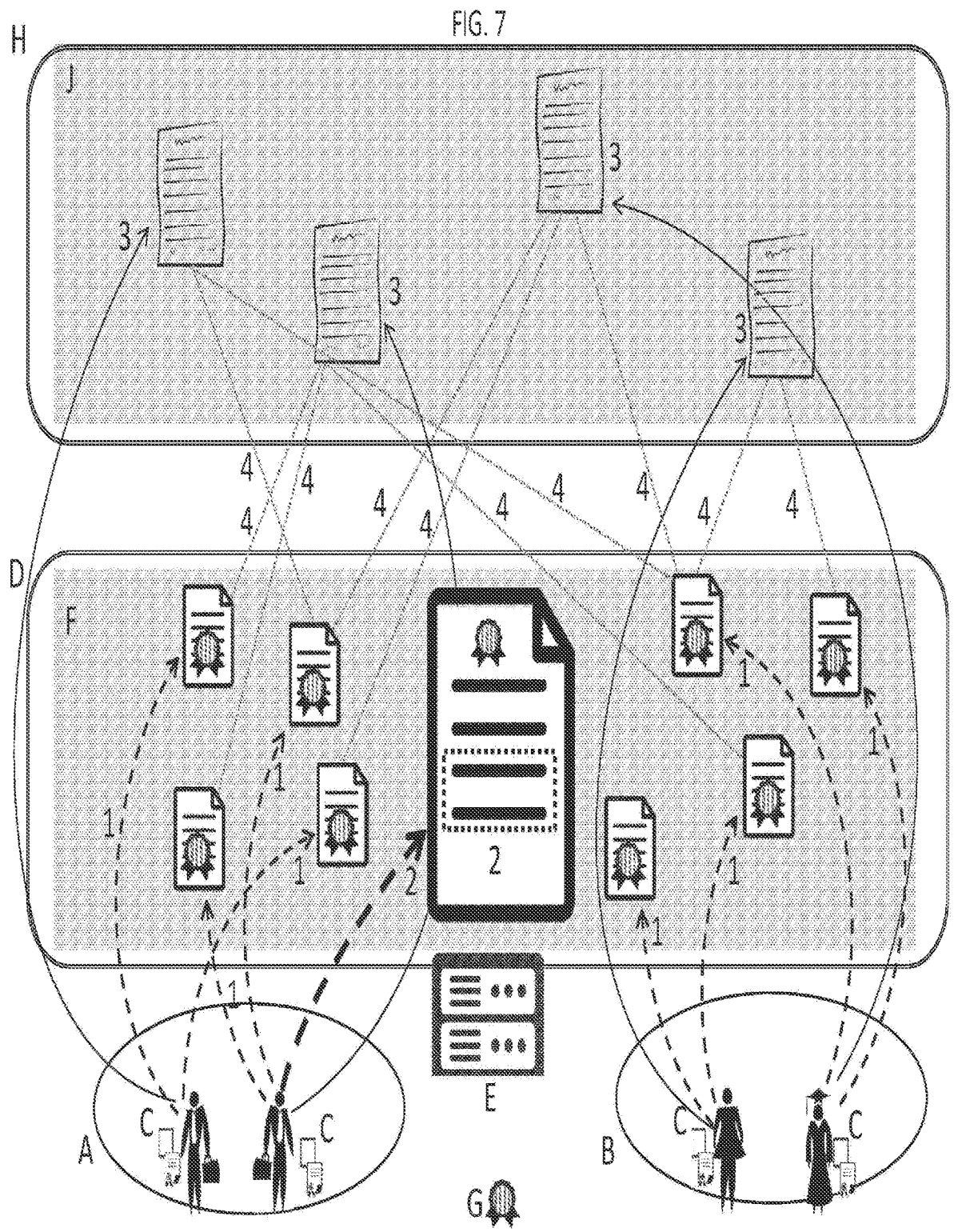
FIG. 7 depicts establishment of a community of common interest, according to some embodiments of the disclosed invention.

FIG. 7 depicts establishment of a community of common interest, according to some embodiments of the disclosed invention. As shown, a community of common interest may be established around, or present itself to members or others in one or more different formats. For example, FIG. 7 shows a community of professionals A and a community of women B. In some embodiments, the community may be established through more than one interface, for example, a website, webpage, app, app-window and/or other interactive methods. In some embodiments, the security ecosystem (e.g., a website) may focus on a topic such as an actual area of history as a common interest (or in other embodiments on an aspect of law or in another embodiment an aspect of medicine or other).

In some embodiments, the security ecosystem may support a software application that runs on a user-controlled device C, or other endpoint device through which a user could interface with capabilities of a security ecosystem. Such a website or app might restrict user commentary and/or evaluation of data to such a designated common interest area. It might also limit uploaded digital records to historical documents, records, events, etc. to align with that common interest. Submitted user data may be limited to demonstrable facts, events, historical records. In some embodiments, such recorded user additions may be encrypted. Decryption may be authorized in a variety of manners, such as by designated identities, user devices, groups, or other, which may include by date and/or by a defined condition, for example, governed by a smart contract that may be recorded on a blockchain. In some embodiment, different members of a group could be given different decryption permissions relative to user additions. For example, no decryption; full decryption; partial decryption; or other. In some embodiments, an encrypted user's addition may contain documents 1, 2, 3, 4 and 5, and user A's decryption rights may only decrypt documents 1, 2 and 4, where user B's decryption rights decrypted 1, 2, 3 and 5.

In some embodiments, a first element D is designed and maintained in way to mitigate against external charges of being part of a "conspiracy theory". A typical counter to a "conspiracy theory" charges could be "what records are false?" with challengers typically being welcomed to become users and introduce their own data. For example, when a user adds or uploads a record to a repository on a security ecosystem server E or other security ecosystem endpoint, the user may digitally sign G added records, documents, referenced passages or other for authentication or other purposes 1. A single security ecosystem may support one or more communities, have one or more common interests, one or more websites, one or more apps or interfaces within a website or app and support other interfaces with users, entities, endpoints or others or an API with which it may interface.

In some embodiments, a user, through its use of a user-controlled device, may digitally sign and/or cite not only records, but designated passages within records 2 and may further designate perceived relationships or links between one or more record, document, passage, etc. or other. Such citations and/or relationships may be acknowledged by an attribute authority through the issuance of, for example, a X.509 certificate. Such citations and/or relationships may be cited in future and possibly extended by other users, in which case an attribute authority may issue certificates to those as well. Certificates contain additional pertinent information, for example, an identity (pseudonymous or not) of a user making a citation or identifying a relationship, etc.; an associated topic, subject or other distinguishing identifier for the use of Users; or other information as may be deemed helpful from time-to-time.

In some embodiments, a security ecosystem establishes a second element additional interface H (for example, a website, webpage, app, app-window and/or other interactive methods) that is used by its community for commentary citations (for example, 3 in FIG. 7); or the establishment of relationships of the records accessible through and/or stored in its own database J or on a database associated with a first website or data storage F. The second element H of the solution is the maintenance of a safe and civil digital environment in which users may propose their version of "connecting the dots" (for example, the aligning individual data recorded in the first element), introducing their opinions and/or other actions. Opinions about data, theories about relationships between and amongst data may typically be recorded by any user 4.

In some embodiments, the second interface may accept comments, opinions, theories, citations, establishment of relationships (or more) regarding records accessible via the first interface. In some embodiments, such recorded user additions are encrypted. Decryption may be authorized in a variety of manners, such as by designated identities, user devices, groups, or other, which may include by date and/or by a defined condition, for example governed by a smart contract that may be recorded on a blockchain. Possibly such a separation of, for example historical records of the first interface or data storage, from commentary entries on the second interface may protect the first interface from being publicly or privately attacked as containing or promoting opinions, "conspiracy theories", or other derogatory attack. Such an arrangement would separate primarily factual data and records (on the first) from opinion or speculation or similar on the second.

Such an arrangement allows users to identify and notate citations and/or relationships between and/or amongst passages, records, historical events, etc. so as to identify some possibly previously less known or otherwise clearly identified alignment, enlightenment or other relationship on a subject, topic, and/or relationship of such items. In one embodiment, such may be made by a user or users, and may be acknowledged by an attribute authority through the issuance of a X.509 certificate.

In some embodiment, user-controlled devices digitally cite the entire or specified portions of such stored digital records and may further indicate perceived relationships between such records or portions thereof or indicate other characteristics of such stored digital records as identified through the actions of a user-controlled device typically with cooperation of an AA or Controller. In some embodiments, a display of digital records or indicated relationships between digital records may be organized and/or displayed based on time and/or other user-defined criteria. Such records, together with, for example, digitally applied citations, indications of relationships, importance, features and/or other perceived significances of such records either on a stand-alone basis or in relationship with one or more other records, each such being preferably identified by a digital citation preferably will support the collaborative contributions of other users of the system.

Typically, such a digital citation identifies a first digital record and one or more second digital records together with an identified possible association between the two digital records. In other embodiments there could be more of each type of record. Such digital citations may form a pattern of information that may be useful or of interest to other users of the security ecosystem system. Such other users may then choose to interact with the security ecosystem and/or its digital records through the use of one or more user-controlled devices. Other users may create their own digital citations, for example commenting on prior citations, extending prior citations, or other. Incorporating many of these components and actions into a system may also result in establishing a Trust-Scoring method to support the value and usability of the system. The System makes extensive use of X.509 certificates, in one embodiment attribute certificates. In some embodiments, a third interface is associated with a first and/or second interface, such that the records and resources assembled can be monetized. The assembled records and their organization may be useful for research, treatment, or expert testimony or more, by lawyers, medical professionals, or the like. In some embodiments, monetization may be achieved by letting some users to see some records but pay to see other records, possibly based on relative trust scores of records, users or other criteria.

Figure 8:
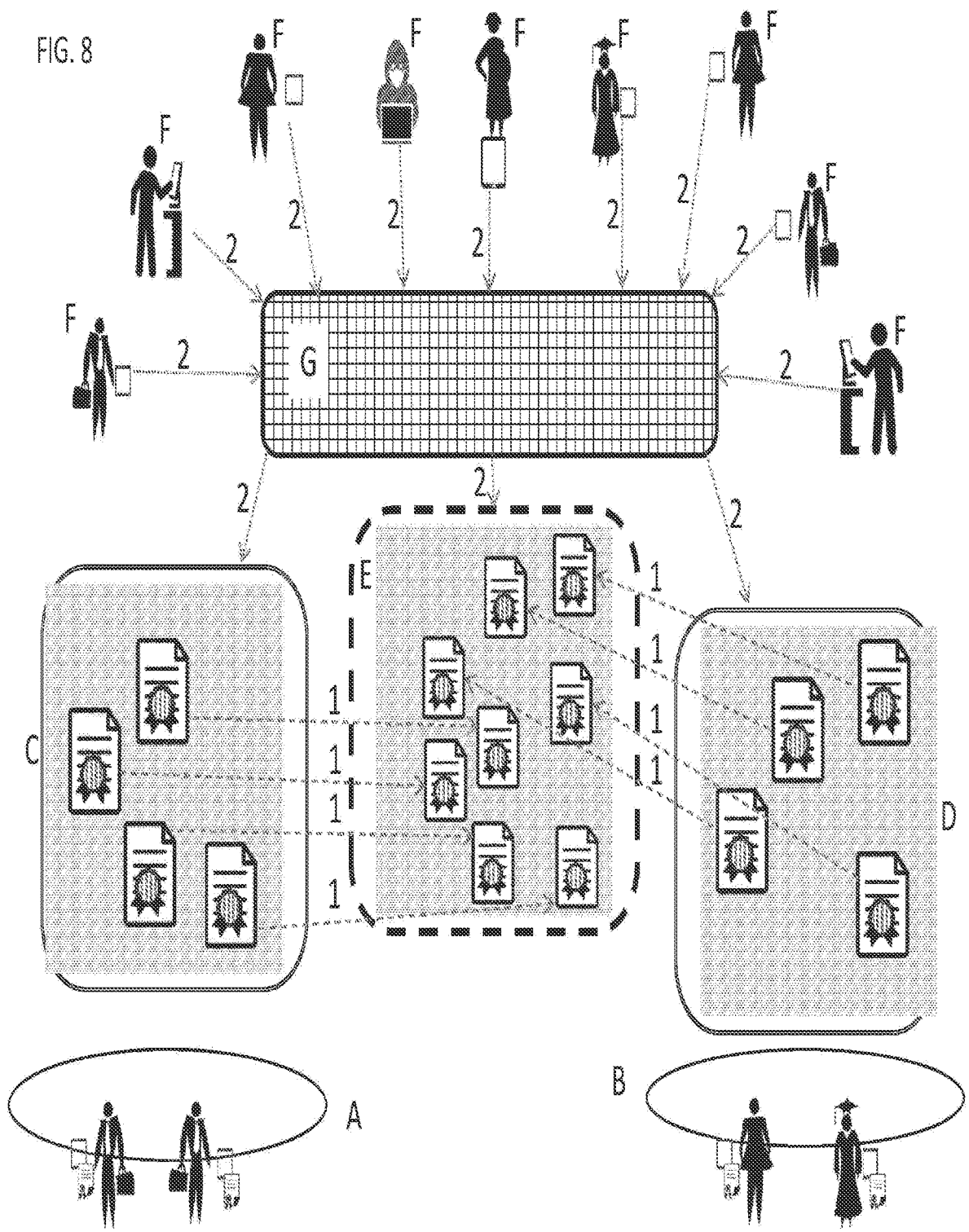
FIG. 8 depicts combining and sharing databases of independent systems.

FIG. 8 shows a plurality of independent systems, each typically focusing on a separate community of interest, according to some embodiment of the disclosed invention. As shown, each independent system focuses on a separate community of interest (for example, history, law A, medicine, education B, one or more subdivisions of these, or others) may each collect all or portions of databases of records (as described herein) in one or more databases C, D which may be blockchain databases. In some embodiments, data from such databases may be combined into a single database E. In some embodiments, access to the data in separate databases (or portions thereof) may be accessed by users with user-controlled devices F through one or more master interfaces (such as a website G). For example, there could be a master first interface and master second interface and a master third interface operating over all databases (or portions thereof) in a similar fashion as to the previously described first, second and/or third interface operate with the own databases.

In some embodiments, records may be recorded on a blockchain and thereby take advantage of one or more of the capabilities typically associated with a blockchain, for example, a distributed database, immutable records, and others. In some embodiments, the security ecosystem may present itself through an application (app or apps), in addition to or rather than through one or more interfaces.

Each environment incorporates built-in safeguards intended to mitigate, for example, the persistence of false or misleading data or alignments; disruptive behavior of trolls; and/or other activities that may be considered to be disruptive to the community of users. The integrity of the system and its data should preferably be protected by a Trust-Scoring and/or Reputation Scoring systems. Each environment also incorporates built-in safeguards intended to mitigate, for example, the persistence of false or misleading data or alignments; disruptive behavior of trolls, and/or other activities that may be considered to be disruptive to the community of users. The integrity of the system and its data is protected by Trust-Scoring and/or Reputation Scoring systems.

In some embodiments, a Trust-Score technology may be employed within the system. User and/or user data/documents/records, etc. may be scored in a Trust-Score system using a variety of metrics. Each new user will typically start its participation with a neutral Trust-Score (e.g., "zero"). A Trust-Scoring system is established with algorithms resulting in the raising and/or lowering of a user's Trust-Score, based on the acceptance, approval, rejection, and/or other metric as may be established from time-to-time. Users may set one or more levels of Trust-Score of data in one or more defined areas of interest (e.g., a subject) that such a user is willing to view. For example, a user may determine not to view any data without a Trust-Score of "10" (an arbitrary number for example purposes). Thus, new data in a defined area with a Trust-Score of "zero" would typically not be visible to that user. The Trust-Score of such new submitted data could rise based on the approval and/or acceptance of other users willing to examine it or take another system-accepted action. Preferably false data would not be accepted, would not have its Trust-Score raised and thus would typically never be seen by a user with a preference for examining only related data with a sufficiently high Trust-Score of, for example, "10".

In some embodiments, trust and reputation may be scored by one or more perceived judgements by other users, entities, communities regarding user actions (as described in this disclosure) regarding their veracity, truthfulness, accuracy, usefulness, perceived values, reliability, hypocrisy or other criteria. Trust and/or reputation of such records may be established and/or measured by active and/or passive metrics. In some embodiments, positive and/or negative citations of such records and/or relationships and/or other described actions, may be established such that a score could add or subtract from a trust scoring or reputation scoring system relative to that record. A relative Trust-Score of a user (or other entity) creating such a citation and/or relationship and/or other described action could affect a relative measure of change in score on such a user's citation and/or relationship establishment might have.

In some embodiments, administrators or managers of the security system may enable users to select a minimum Trust-Score level (score) that other users and/or devices and/or software applications utilized for access by such other users must currently have attained (e.g., either the last score or the average score) in order for a relying party user and/or their device to accept, view or act on received content or in order for a relying party user and/or their device to enable such other users and/or devices to access that relying party's content.

For example, in a priority specification, it may have been indicated that certain documents can only be opened via an installed client as opposed to via a browser. Adding a 3rd dimension, for example, determining or adjusting the Trust-Score of a user based on the trustworthiness, credibility or value of document, predictions or other content that the user has originated or redistributed. Users are therefore be motivated to provide trustworthy data to a system in order to achieve or maintain a desirable Trust-Score for themselves and/or their data.

In some embodiments, through an Inviter-Invitee protocol, users may vouch for the identity and/or possibly trustworthiness of prospective new users and/or existing users. Such a vouched-for user could have its Trust-Score positively or negatively adjusted by the strength or weakness of an inviter user(s). An inviter user could have its Trust-Score positively or negatively adjusted by trustworthiness of future actions of its invitee user(s). Users are expected to protect their Trust-Scores which typically include protecting their identity, for example, by being diligent in protecting their user-controlled device. While it may be rare, devices may get attacked by malicious actors. For example, malicious activities under the guise of another user's identity may well do damage to that user's Trust-Score. A user may, for example, review system notifications of activity under that user's identity and report any unauthorized activity. Other mitigations and actions may be employed by users and/or the system.

In some embodiments, there are multiple monetization opportunities for the system. Fees or revenue could be based on metrics such as the Trust-Score of a user and/or the user's data; a user fee; records added; citations and/or links made; opinions added; records viewed; opinions/links accessed; records uploaded; records downloads and/or other metrics that may be considered useful.

In some embodiments, the security ecosystem of the disclosed invention is generally composed of a number of components that typically integrate with each other together with other elements that typically provide support to the security ecosystem. Together, these are graphically represented in a Trust Stack as shown in FIG. 9 and FIG.

Figure 9:
FIG. 9 shows a trust stack for an IoT, according to some embodiments of the disclosed invention.

FIG. 9 shows a trust stack for an IoT, according to some embodiments of the disclosed invention. The portion of the trust stack for the IoT that is comprised of the combination of typically five authentication IoT security and management elements 902 to 910 (which are considered to be complementary to the security ecosystem). They include an anomaly detection and failure reporting 902; security best practices 904; certificate-based authentication 906; Device Root of Trust and crypto capabilities 908; and PKI 910.

Figure 10:
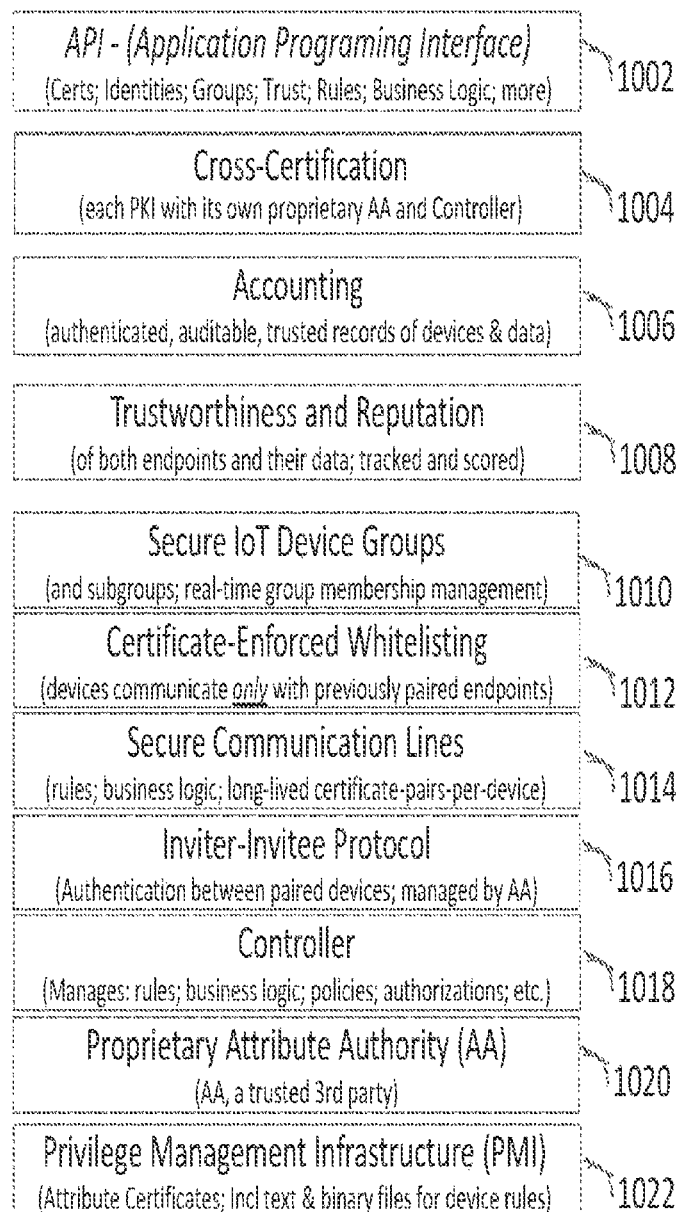
FIG. 10 shows the portion of the trust stack incorporating authorization components and complementary IoT building blocks, according to some embodiments of the disclosed invention.

FIG. 10 shows the portion of the trust stack incorporating authorization components and complementary IoT building blocks, according to some embodiments of the disclosed invention. The complementary IoT building blocks generally make up the security ecosystem. An authentication component of an endpoint is generally one of the five components identified on FIG. 10. The authentication component may be built into an endpoint device during manufacturer, assembly or other. In some embodiments, an authentication component may not currently exist on some endpoints and may be desired, in which case, preferably one could possibly be added to an endpoint by various methods, such as: plugged into a slot within the endpoint; attached to a board within the Endpoint; added as a peripheral and connected to an Endpoint; or other.

The authentication portion of an endpoint preferably is to support the establishment and/or receive an acknowledgement of a second authenticated endpoint identity, and (a) provides identity authentication for its endpoint; (b) supports the execution of an Inviter-Invitee protocol; (c) supports the establishment of secure communication lines; (d) supports certificate-enforced whitelisting; and (e) supports other capabilities of the security ecosystem.

An Attribute Authority 1020 performs many unique functions, typically including: acting as a trusted third party security ecosystem for devices/endpoints; running the Inviter-Invitee protocol to authenticate communication lines between paired endpoints; establishing and authenticating unique identities of IoT devices (or other computing devices); uniquely associating cryptographic keys to their identities; providing a trusted exchange of authenticated public keys between endpoints; arranging for the issuance of certificates; uniquely associating PKI certificates and/or attribute certificates with endpoints, communication lines, groups, etc. as needed; as well as performing other functions. A portion of the duties, functions and operations of the AA in priority filings are being retained by the AA, however, a portion of these functions and operations are being associated with a new functional component being called a "Controller" 1018. Moreover, the PKI of one security ecosystem may practice cross-certification 1004 of certificates, identities, and/or other attributes with the PKI of another security ecosystem.

The Attribute Authority 1020 functional component retains its functions of managing the authentication of endpoints, the establishment of secure communication lines, the establishment of secure (IoT) groups 1010, and importantly being responsible for attesting to the attributes of the endpoints. As an analogy these are generally functions associated with a typical "Registration Authority (RA)" role for a certificate authority (CA). The Controller 1018 functional component is associated with some responsibilities up until now associated with the AA, such as being responsible for defining resource access rules. For example, the Controller would be responsible for establishing and promulgating rules, business logic, etc. for secure communication lines and groups, subgroups, etc. In another example, a Controller is responsible for defining generally the sharing of resources in the system. In an embodiments of security ecosystem use-cases, the controller may be a traffic control center; a class instructor of a class of multiple users with user-controlled devices; or an operator of an electrical system. The Controller 1018 and/or the Attribute Authority 1020 may be managed through an API 1002 and/or through an AI capability or other.

In some embodiments, the endpoints, communication lines, and groups are given a policy (typically through a certificate provided by an AA) established though a Controller. Further, the modification of system-wide rules, business logic, etc., would typically be managed by the Controller. The Controller may modify the sharing rules, etc. over time and supports API access and control.

Other functions that may be managed by and/or executed through the Controller include: enabling devices to be added and/or removed from the system; defining resources to be shared; defining policies that might be put into place for sharing of resources; determining procedures for admitting and/or removing devices from the system; determining procedures for authorizing devices to enforce/utilize policies; change policies and/or enforcement of the policies in preferably real time; allowing a device/user to opt in or out of a policy; allowing a device to obtain evidence of trustworthiness and/or reputation 1008 (e.g. an attribute certificate) to assist in a policy decision; secure management of complex authorizations; traffic analysis resistance; and/or others.

In some embodiments, an Inviter-Invitee Protocol 1016 processing is used between two IoT devices or other endpoints for creating secure communication lines. The protocol addresses a challenge of authenticating relationships between devices with cryptographic certainty (whether the devices are remote and/or local). Completion typically includes acceptance of any digital agreement(s) proffered by the inviter as generally recorded on an attribute certificate. Inviter and Invitee processing generates digital audit trails.

Supported by the user of a centrally managed PKI, the security ecosystem provides endpoints with an ability to authenticate paired relationships with each other through the application of an Inviter-Invitee protocol (typically with user-controlled endpoints, the protocol is initiated by endpoints, with support and completion being provided by the AA. In some embodiments, with IoT devices, the protocol is initiated and managed by an AA, in combination with an artificial intelligence (AI) capability. Upon the successful completion of the Inviter-Invitee protocol, a secure, persistent, authenticated communication line is established between the two endpoints through the issuance of a certificate with rules. By repeating this process, the security ecosystem creates multiple one-to-one relationships that can grow to an effectively unlimited number of such authenticated pairs. Communication lines may be created on an as-needed-basis.

Communication lines are generally characterized by endpoints with context-specific identities that are typically governed by an end-to-end digital agreement. They are preferably auditable, brokered, trusted-relationships where such relationships/digital agreements typically each stand-alone, for privacy purposes, or can leverage the build-up of identity confidence levels across relationships. The attribute certificate gives the secure communication line persistence thereby providing the two endpoints with an authenticated, trusted, long-lived relationship that they can typically utilize indefinitely into the future. The AA acts as a trusted third party security ecosystem for users/devices in running the Inviter-Invitee protocol used to authenticate each communication line by: (a) establishing and authenticating unique identities of IoT devices (or computing devices); (b) uniquely associating cryptographic keys to their identities and those of their invitees; (c) providing a trusted exchange of authenticated public keys between the endpoints; (d) uniquely associating an attribute certificate with each communication line.

In some embodiments, the secure communication lines 1014 detail the authenticated relationship established between each pair of endpoints; noting that this is not a communication protocol, rather it is used independently of existing network/IoT communications protocols without conflict and can support such protocols, particularly as relates to endpoint authentication.

Devices/endpoints may be grouped into different groups and subgroups based on predetermined criteria. This can provide stratifications for security and management of devices. Each group membership may be established through respective attribute certificates of respective devices, which may include associated rules for group membership in the attribute certificate. Beyond certificate-enforced whitelisting 1012, device group management provides another layer of security by permitting communication only between endpoints and designated groups and/or subgroups, as well as, between designated groups and/or subgroups. Also, the use of rules associated with communication lines and/or groups may preferably further direct the handling of information for data privacy, for example, by including a requirement(s) for encryption of data; or directing specific devices/endpoints that may or may not receive specified data, as well as other rules and/or business logic.

In some embodiments, a "group" includes all of the IoT devices in a single vehicle and a subgroup might encompass the rear sensors. In another group, authenticated personnel could be assigned to a "Maintenance Group". With any group's membership being manageable in real-time then, for example, any Maintenance Group member could be trusted by a vehicle's IoT devices with that trust being confirmed by the "trusted" group attribute. Other examples of possible groups are: the traffic lights in a city; the street lights in a city; all of the vehicles of a single OEM; a city's fire engines; a defined group of roadway sensors; etc.

Through the use of secure communication lines 1014 to establish relationships between known endpoints, trust and reputation become usable as more reliable factors. Performance metrics of activities of and between endpoints using established communication lines and/or certified groups, typically affect the trust and/or reputation of participating endpoints. Reputation of devices and of users is dependent upon perceived device robustness (which may change during the life-cycle of a given instance of a device), payment timeliness, and/or service performance timeliness, completeness, accuracy and/or other factors. Reputation scores may come into play as part of a secure management of complex authorization(s), particularly where the management involves considerations of trust metrics that the current attribute authority was not involved in populating.

The security ecosystem may deliver an accounting solution 1006, including capabilities to monitor and record each endpoint's activity. The accounting solution may include layered auditability measures and make use of digital signing capabilities, while also providing support for more detailed accounting metrics. The system provides trusted records, devices and data.

Typically, any two devices are unknown to each other, until the AA gets involved with an Inviter-Invitee protocol. In some embodiments, two devices may have worked cooperatively in the past as members, possibly as part of a swarm of devices in a context that did not require a secure communication line, and in the process may have registered a positive (or negative) outcome prior to the current circumstances in which involvement of an AA is required to issue a secure communication line attribute certificate (which may, in turn, have a dependency on individual device attribute certificates that may have been issued by AA(s) other than the AA involved in setup of the secure communication line). Such prior knowledge may be made use of by a device.

A device's signature verification public key or a public key certificate that contains that public key as subject public key may be referenced by a device-specific attribute certificate (where either an AA or another device accesses and validates that attribute certificate) or an AA already may already have direct knowledge of the attributes of the devices.

Secure Shell (SSH) is a cryptographic network protocol for securely operating network services over an unsecured network. The SSH specification acknowledges that its own protocol is "vulnerable to denial of service attacks" and that "implementors SHOULD" only allow "connections from a subset of clients known to have valid users." Using Secure Communication Lines together with other actions described herein, possible mitigation for such a vulnerability may be available. Denial of Service attacks (DoS and DDoS) are examples of the type of attack identified.

The result of the Inviter-Invitee protocol is the establishment of a secure communication line between the paired endpoints. Each established secure communication line typically includes an appropriate digital agreement between the endpoints. An agreement or certificate may include business logic, and/or also may reference a signed, binary file that a device may execute and operate upon.

The security ecosystem may embed one or more nonce and/or public key into these long-lived secure communication line certificates with per-pairing encryption details. Secure communication line certificates are typically established before any subsequent live communications protocol attempt occurs between the endpoints (and thus before a nonce is normally used). The security ecosystem's use of long-lived certificates-per-pair-of-devices introduces a benefit over typical SSH and/or TLS. For a typical interactive connection, SSH uses a nonce every time (as the security ecosystem does), however, the security ecosystem typically also use nonce and public keys in the initial secure communication line trust setup. Because SSH typically does no advance trust set up, SSH must then be considered "Trust on First Use" (TOFU).

The security ecosystem of the disclosed invention improves the application of SSH (and/or TLS) between endpoints by generally moving to a paradigm using embedded, long-lived pre-pairing resulting in a security ecosystem principle that may be referred to as "Trusted Before First Use". In some embodiments, steps to accomplish such trust prior to initiating an SSH (and/or TLS) connection are generally described in FIG. 11.

Figure 11:
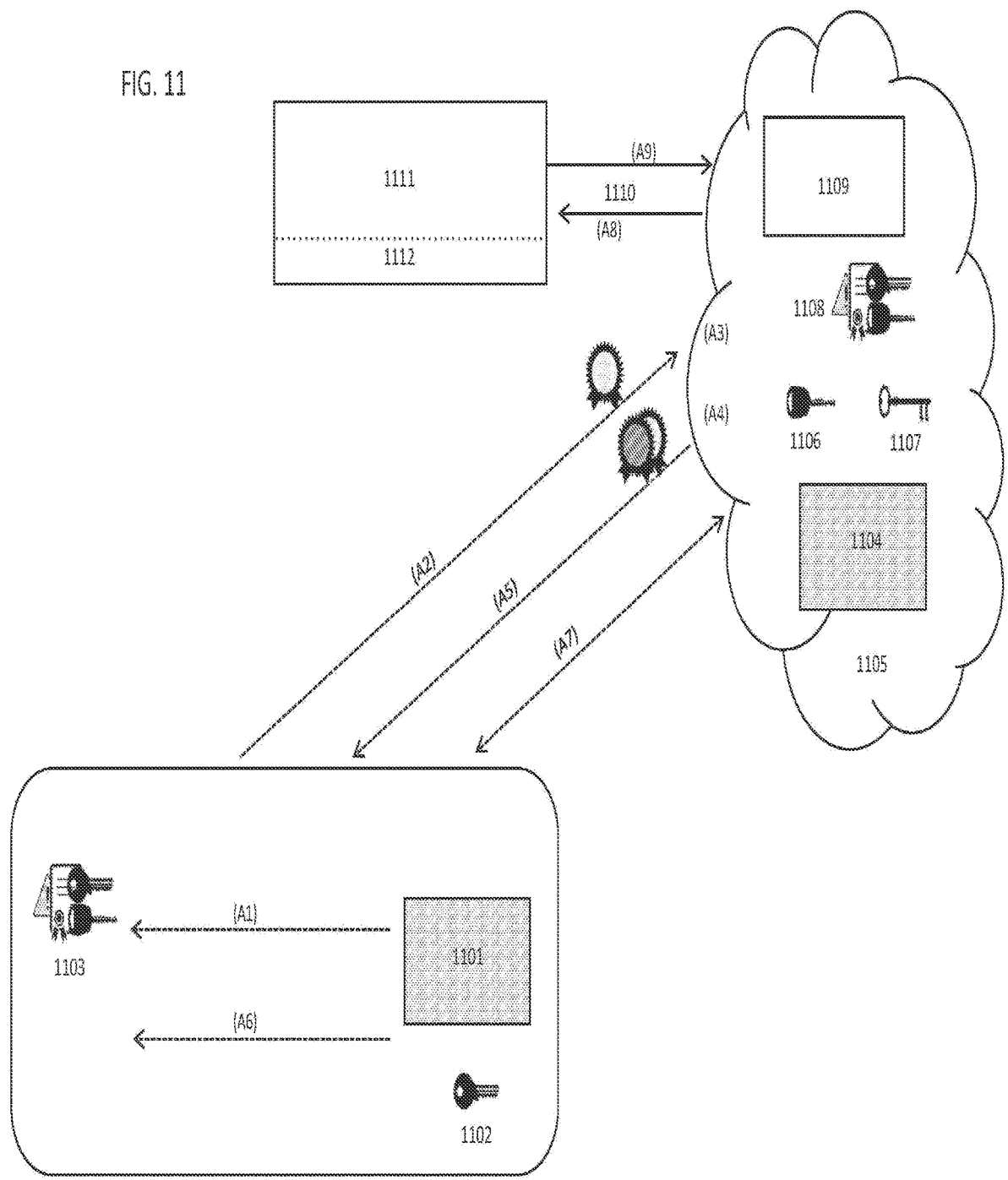
FIG. 11 is an exemplary process flow for establishing trust between two endpoint devices, according to some embodiments of the disclosed invention.

FIG. 11 is an exemplary process flow for establishing persistent trust between two endpoint devices, according to some embodiments of the disclosed invention. Shown are a first endpoint device 1101, a first endpoint device Public Key 1102, a communication line certificate (holding the public key of each endpoint 1103) for the first endpoint device 1101, a second endpoint device 1104 in a cloud 1105, a second endpoint device Public Key 1106, a second endpoint device private key 1107, a communication line certificate (holding the public key of each endpoint) for the second endpoint device 1104, an Attribute Authority and Controller 1109, an API 1110, a Public Key Infrastructure (PKI) and Privilege Management Infrastructure (PMI) (e.g., 1022 in FIG. 10) and other software 1111, belonging to an Entity 1112.

This figure shows a first endpoint device originating a communication to a second endpoint device when a communication line already exists between them. Therefore, each device has previously been authenticated and is known to the other. Second endpoint uses the communication line certificate it already has to cryptographically authenticate the request for communication from the first endpoint device before responding. It then responds in a cryptographically manner such that the first endpoint device is able to authenticate.

For example, at (A1), the first endpoint device views a communication line certificate(s) to determine authenticated endpoint(s) with which it may communicate (e.g., the second endpoint; also, the first endpoint may consult rules recorded in the certificate for conformance). At (A2), the first endpoint device sends digitally signed request to establish communication to authenticated second endpoint; and at (A3), the second endpoint device validates the first device's request using first device's public key from communication line certificate. At (A4), the second endpoint device signs acceptance of request using its private key; and at (A5), it replies with digitally signed acceptance. At (A6), the first endpoint device validates signed acceptance using Second endpoint device's public key from communication line certificate. At (A7), TLS (or other) connection is established and data is exchanged between the endpoints; and an API is used for reporting and updating queries as appropriate, at (A8). At (A9), an entity (or other user) receives and uses data and has specified control over the security ecosystem via an API.

Based on such trust, then a trusted SSH (or TLS) session may be established (at (A7)). Generally, without the trust-establishing steps A1 to A6 associated with a SCL, then a common-practice un-authenticated invitation (not shown) would be initiated before a typical TLS session would be established. Using such a procedure, a device (or other endpoint) may have an enhanced ability to authenticate another device (or other endpoint) attempting to establish live communication with it before entering into a communication protocol, thus mitigating the commencement of a DDoS attack (when there's no live communications protocol, there's no DDoS attack opening). DDoS attacks are typically established by untrusted remote devices establishing a legitimate communications protocol session with another device followed by some misuse, abuse or other unexpected behavior by the remote device using the established communications protocol.

Beyond DDoS protection, a device or other endpoint may preferably be instructed to only enter into a communication protocol (e.g., SSH, TLS) with other endpoints with which it has a pre-paired SCL. Such arrangements have been referred to as "certificate-enforced whitelisting". Rules, business logic, binary file, etc. that may be associated with a SCL may include rules for an endpoint device to implement that are not strictly associated with the SCL only. Rules, business logic, binary files, etc. may also be issued by a trusted source to an endpoint device by generating a certificate, where these are not associated with any SCL and their utilization may require that specific actions be taken by the endpoint devices.

Generally, there are additional possibilities relative to limiting denial-of-service as well as enabling communications that are unlinkable by unauthorized entities. In some embodiments, where a requesting user or device only gains access to a batch of one or more one-time-use key agreement certificates owned by a user or device with which the requestor intends to communicate if the requestor has a pre-existing secure communication line with that user or device. Although these one-time-use/transaction certificates are generated on the fly by a certificate authority, if the requestor preferably includes one of these certificates in its transaction with the user or device that owns that certificate, then that user or device is preferably equipped to recognize that certificate as one that it owns (even though it has not seen it before) and thus to derive the corresponding key agreement private key that enables it to decrypt the communications.

The requestor may also include along with the signed transaction/communications a one-time-use signature certificate that it owns that typically does not disclose the attributes of the requestor except to the intended recipient when used in conjunction with the key agreement-enabled targeted disclosure of one or more such attributes. Such one-time-use certificate preferably enables verification of data integrity of the transaction and provides entity authentication in that the originator of the transaction is proven to possess the privately disclosed attributes.

The one-time use signature certificate associated by the signed transaction with a one-time-use/transaction certificate acquired above based on a preexisting SCL may be leveraged to authenticate a subsequent TLS session. For example, the transaction may constitute an on-blockchain willingness and proof-of-fitness of a device to participate in a task, while the ensuing TLS session is at least one element in fulfilling the task.

In some embodiments, the security ecosystem enables "pre-validation" that eases submitted transaction validation phase requirements for typically IoT devices to speed up the processing time. For example, a user logs into the security ecosystem to associate an enrollment certificate with the user's profile. The security ecosystem checks for static identity/identifier match, and requires proof of possession of an enrollment private key. User requests AA-issued specialized attribute certificates that each reference enrollment certificate of requester and include one or more pairs of hash (enrollment certificate) and associated pointer value. The pointer value may be for an attribute certificate for a communication line that indicates requester is eligible to transmit to the owner of that enrollment certificate. This eligibility may result from an Inviter-Invitee protocol run, where the User was an inviter or invitee or a specified delegate. This may have been a direct invitation or one that leveraged chained attribute certificates. The AA can require the User to prove it has legitimate access rights to the pointer value(s).

In some cases, it may be desirable to provide for an un-linkability between transactions. This is a feature generally relevant to multi-tenant environments such as blockchain as well as to scenarios such as vehicle-to-vehicle collision avoidance. Generally, TCerts enable users or devices to communicate with one another as legitimately currently non-revoked entities without enabling clustering according to which transaction certificates are owned by the same users or devices. There can be a rich attribute release mechanism whereby a user or endpoint may reveal certain attributes to intended recipient endpoints/users (such as demonstrable membership within a group) without revealing the first user's or endpoint's true or pseudonymous identity.

If a security ecosystem's AA is recognized by Transaction Certificate Authority (TCA), which may be a subordinate TCA (i.e., a TCA which is subordinate to a Primary TCA), user can request a batch of key agreement TCerts owned by the entity that owns one or more of the attributes that the requesting user identifies (as learned by the user through querying the security ecosystem via the pointer values). Subordinate TCA matches the indicated hash(enrollment certificate) of the AA-issued specialized attribute certificate against one or more Template TCerts that include hash (enrollment certificate) as an index. The request can potentially be approved either way, but the resultant key agreement TCerts can include a flag visible to key agreement TCert owner that indicates whether or not communication line exists (and indicates that the key agreement TCert is not "reflexive," i.e., that it is not owned by its requester). Key agreement TCerts are not successfully reusable, as enforced via validation.

As an anti-phishing measure, subordinate TCA does not selectively release sensitive attributes of issued TCerts—even if known by non-reflexive key agreement TCert requester, unless at a minimum, flag is set because of requester-demonstrated knowledge of static or pseudonymous identity/identifier. For example, an account number is revealed by that account holder within a blockchain transaction responsive to a previous blockchain "flagged" transaction (where that previous transaction creator may have selectively released one or more relevant attributes of the signature TCert). Account numbers may be subaccount numbers (to dilute account activity leakage). Common ownership of subaccounts is not revealed even if recipients from different subaccounts collude.

While it is generally true that an authentication process will typically abort if the digital signatures do not verify, verifying such asymmetric signatures is generally less efficient than other operations such as a symmetric decryption or HMAC computation. In some embodiments, TCerts are used (even besides their general utility to defend against traffic analysis) so that a device can perform a fast-symmetric decryption operation against a key agreement TCert to determine whether an entry on a blockchain is legitimately intended for that device, where the general heavy lifting to get to that point has typically already been done without participation by the intended recipient device.

With an ability to procure such key agreement, TCerts can be limited to devices that have an SCL with that intended recipient device, and validators of a blockchain ensures that only never-before-seen key agreement TCerts appear within transactions that are successfully incorporated into the blockchain and that the entire transaction bears a valid digital signature that typically verifies using the public key of a legitimate signature TCert included in a candidate transaction. There may be attempts to shield resource-constrained devices (such as IoT devices, as opposed to servers equipped with very significant load-balancing capabilities) from denial-of-service attempts. There may also be an issue of using unwitting devices to do the dirty work of DDoS by forming a botnet to launch such attacks. Using secure communication lines to authorize OTA "upgrades" of device firmware mitigates against this.

"Un-linkability" is a feature relevant to multi-tenant environments such as blockchain and relevant to scenarios such as vehicle-to-vehicle collision avoidance. This enables users or devices to communicate with one another generally as legitimately currently non-revoked entities without enabling clustering according to which transaction certificates are owned by the same users or devices. Also, there can be a rich attribute release mechanism whereby one may reveal certain attributes to intended recipients such as demonstrable membership within a group without revealing one's true or pseudonymous identity. In some embodiments, the certificate private key protects a discovered identity public key from being effectively used in a spoofing attack.

Figure 12:
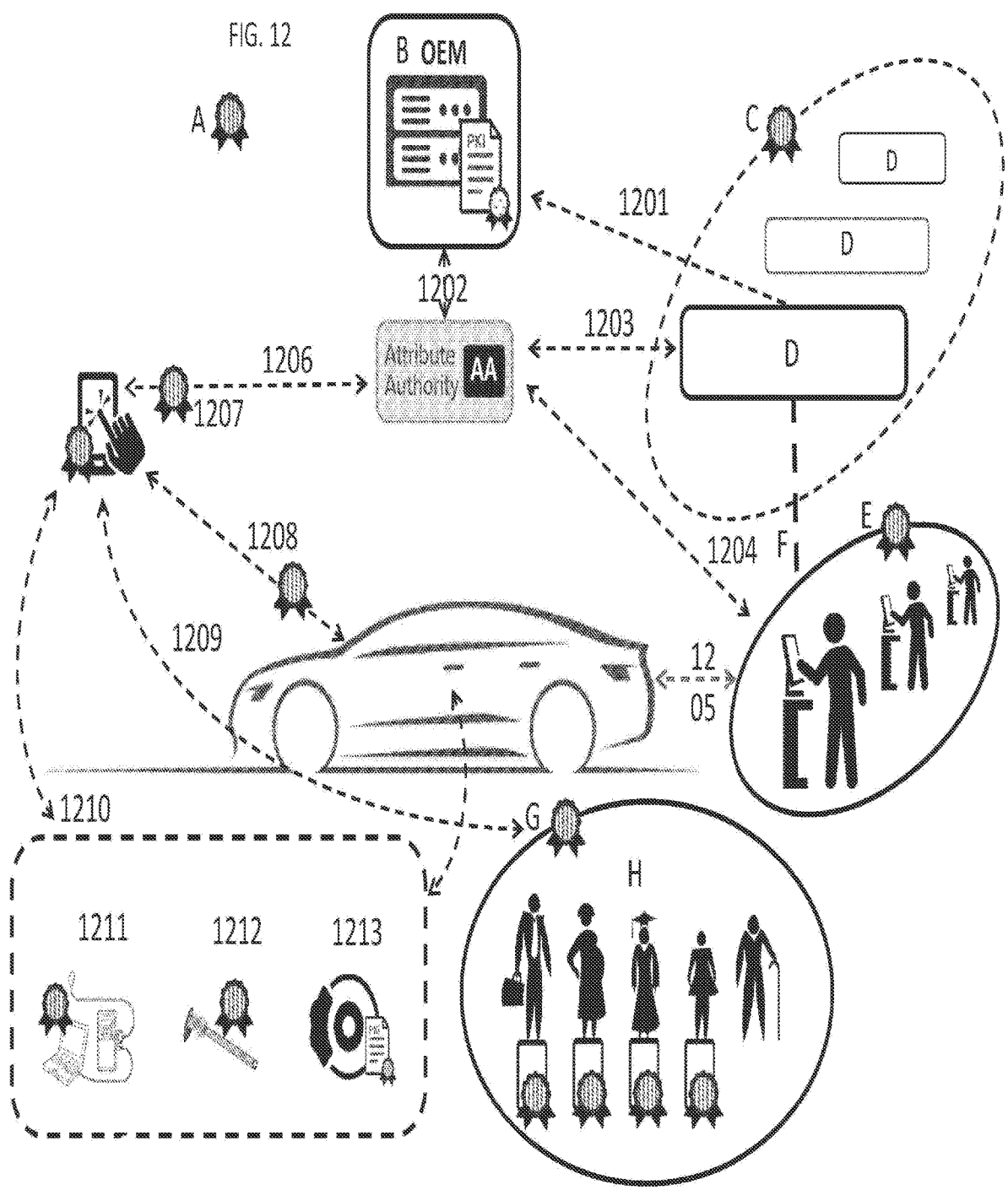
FIG. 12 depicts a vehicle owner's right of repair, according to some embodiments of the disclosed invention.

FIG. 12 depicts a vehicle owner's right of repair, according to some embodiments of the disclosed invention. Under certain laws many automotive vehicle owners have a "Right-to-Repair" their own vehicles. This presents technical and security challenges to some automotive OEMs. FIG. 12 illustrates one or more embodiment of these challenges together with possible applications of how the security ecosystem might be used to mitigate, manage and/or solve such challenges.

As shown, the vehicle owner's right of repair includes: attribute certificates "A"; Original Equipment Manufacturer (OEM) "B"; attribute certificate for a dealer group "C"; individual automotive dealers "D"; attribute certificate for a mechanics group "E"; an automotive dealership relationship with a mechanics group "F"; family driver group "G"; and individual family driver members with their separate user devices and attribute certificates "H."

In some embodiments, the typical processes in FIG. 12 include:

At 1201, Dealer confirms owner's purchase with OEM.
At 1202, OEM confirms to AA the details of the purchase.
At 1203, AA confirms purchase with dealer.
At 1204, AA authorized mechanic group to establish communication line with the vehicle.
At 1205, Mechanic group establishes communication line with the vehicle.
At 1206, Owner's device (e.g., smart phone) is authenticated by the AA (with the OEM) then, the vehicle is authorized (with rules) for OEM App.
At 1207, AA authenticates secure communication line with user-device and issues certificates with rules, business logic; and more.
At 1208, Vehicle owner is provided with configurable access to vehicle data, OEM-supported optional control of future vehicle features, and OEM/dealer sending owner-specific alerts, appointments.
At 1209, Owner controls its family driver group.
At 1210, Owner gains right to repair with OEM's obligation of support.
At 1211, Right to repair provides the owner with authorized & limited vehicle access
At 1212, Right to Repair provides the owner with Authorized OEM tools.
At 1213, Right to repair provides the owner with authenticated OEM parts for authorized installation.

Some examples of right to repair may include: authentication of an entity conducting a repair (e.g., vehicle owner; repair shop); authentication of tools for vehicle access and/or diagnostics and replacement; authentication of replacement parts; authorization of an entity conducting a repair or replacement and/or possibly of a specific parts; authorization of an authenticated part for a specific vehicle and/or that it is preferably properly integrated in a vehicle; accounting of records showing specific authenticated parts installed in a specific vehicle; report of testing results; a resulting functioning of a completed repair; updated owner/vehicle records with preferably sharing to an OEM and/or Dealer and/or owner and/or other.

Some examples of use of a family driver group may include: a family member may be authorized to enter car and trunk, but not under the hood; a parent is remotely notified when daughter is driving and the tire pressure, oil or coolant is low; a teenage son may open the hood, but not drive faster than 60 MPH and others.

This way, the security ecosystem provides for real-time control of group membership, configurable dealer's rights, configurable each mechanic's rights to vehicle access and parts replacement by an OEM to AA to certificates at the group and/or endpoint level.

In some embodiments, the security ecosystem integrates with and is able to modify the standard protocols like, SSH and TLS to improve connection performance by removing the public key-based handshake. The security ecosystem also includes the capabilities for reputation-based authorization decisions and transitive trust decisions.

In some embodiments, the security ecosystem supports: multiple attribute authorities and/or controllers; zero trust characteristics and/or integration; endpoint storage of an agreed upon symmetric key used only for a specific secure communication line; attribute certificate chaining; endorsements of endpoints and data; and an authority issuing one-time-use/transaction certificates (T-certs). The use of secure communication lines inductively with the help of an attribute authority and/or controller to prove to (or encourage) other entities why they should agree to form a secure communication line with one or more of the parties identified within a previously existing secure communication line. Management of secure complex authorization of resource access between devices may be performed in real time.

Many existing endpoint devices do not have existing authentication components (as defined earlier in this application). Lack of an authentication component typically limits an endpoint's ability to properly authenticate and therefore limits an endpoint's ability to support the authorization and other capabilities of the security ecosystem.

Figure 13:
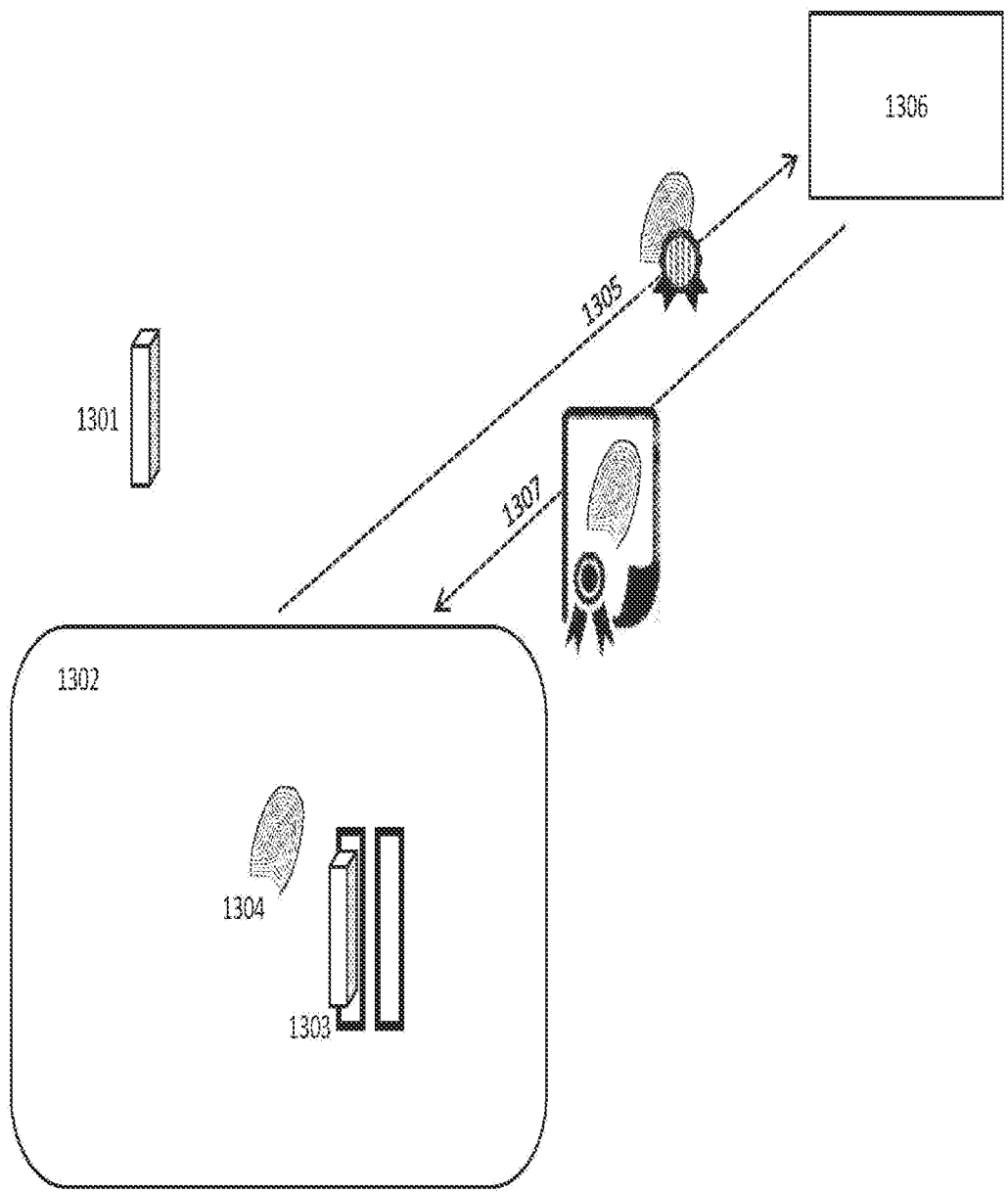
FIG. 13 shows an endpoint with an authentication component, according to some embodiments of the disclosed invention.

FIG. 13 shows an endpoint with an authentication component, according to some embodiments of the disclosed invention. As shown and previously described, an authentication component 1301 is added to an endpoint 1302 by various methods, such as, plugged into a slot 1303 within the endpoint; attached to a board within the endpoint; or added as a peripheral and/or connected to the endpoint. Such addition is considered to be an Add-In authentication component. In some embodiments, an Add-In authentication component creates a device fingerprint 1304 of an endpoint device in which, the Add-In authentication component was installed and/or authenticated. Thereafter, the Add-In authentication component: (a) associate itself with the device fingerprint for the endpoint in which it has been associated with; and (b) provide a (signed) then current device fingerprint 1305 to an AA 1306 or controller. Such an association may be issued a certificate by an AA before a secure communication line is to be established for that endpoint and/or such a device fingerprint may be included in a certificate for an SCL 1307.

In some embodiments, an Add-In authentication component periodically updates its device fingerprinting for its own confirmation or that of an AA and/or a controller that then the current device fingerprint is sufficiently similar to a previous device fingerprint that it would be considered reliable that the Add-In authentication component remains in the same endpoint device.

In some embodiments, an Add-In authentication component authenticates a device fingerprint with an AA or a controller (for example, using one of the methods described in this section) and receives a certificate to the effect that the Add-In authentication component's use of the SCL continues to be valid; or have such be made known through an updated issuance of an SCL cert. Typically, such an updated cert would be valid for a flexibly defined period of time. So long as the use of the SCL (or other permitted activity of an endpoint) were made within that time, it would be valid. However, if the duration specified were exceeded, use of the SCL would be invalid. In some embodiments, a real-time revalidation of the device fingerprint may be required prior to use of the SCL or other permitted activity of an endpoint.

In some embodiments, authentication methods described above may be supplemented with capabilities built into a user-controlled device, for example, fingerprint verification, face ID and or other biometric methods. In some embodiments, an app on a user-controlled device creates a current device fingerprint, signs it and send it to a controller, which in turn, compares it to one or more prior device fingerprints, and then approves or rejects an action or act on it in some other way.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A method for utilizing a communication line certificate corresponding to a first device and a second device for a communication line, each of the first and second devices including a hardware processor and associated memory, the method comprising:
   generating a digitally signed request by the first device, wherein the digitally signed request comprises a first proof of an association of the first device to the communication line;
   transmitting the digitally signed request to the second device;
   verifying the first proof by the second device to produce a first verification of the association of the first device to the communication line; and
   generating a digitally signed acceptance by the second device, wherein the digitally signed acceptance comprises a second proof of an association of the second device to the communication line.

2. The method of claim 1, further comprising verifying the second proof by the first device to produce a second verification of the association of the second device to the communication line, wherein the first proof is generated using, at least in part, a first private key corresponding to a first public key that is contained within or referenced by the communication line certificate, wherein
   the second proof is generated using, at least in part, a second private key corresponding to a second public key that is contained within or referenced by the communication line certificate, and wherein
   the first verification uses the first public key, and the second verification uses the second public key.

3. The method of claim 1, wherein the first verification comprises a precondition of use by the second device of a first public key that is contained within or referenced by the communication line certificate in establishment of a session key, and wherein the second verification comprises a precondition of use by the first device of a second public key that is contained within or referenced by the communication line certificate in establishment of the session key.

4. The method of claim 1, wherein a record layer of a standard communication protocol is executed using a session key that is established using at least one of: a first public key that is contained within or referenced by the communication line certificate, and a second public key that is contained within or referenced by the communication line certificate.

5. The method of claim 1, wherein the first device's association to the communication line comprises a precondition of the first device receiving a batch of one or more one-time-use key agreement certificates owned by the second device.

6. The method of claim 1, wherein a transaction generated by the first device comprises: a first one-time-use key agreement certificate included within a batch of one or more one-time-use key agreement certificates owned by the second device; and a one-time-use signature certificate owned by the first device.

7. The method of claim 6, wherein one or more attributes of the first device as associated with the one-time-use signature certificate are accessed via the transaction by the second device using its knowledge of a private key corresponding to a public key contained within or referenced by the first one-time-use key agreement certificate, and wherein at least one of the one or more of the attributes is used as proof-of-fitness of the first device to participate in a task.

8. The method of claim 6, wherein a public key contained within or referenced by the one-time-use signature certificate owned by the first device is used to authenticate entering into a communication protocol session with a third device that may be the same as or different than the second device, wherein the communication protocol session comprises at least one element of fulfilling a task.

9. A system for establishing secure communication between a plurality of devices coupled to a communication network, each device including a hardware processor and associated memory comprising:
   a first device for inviting, via an invitation transmitted over the communication network, a second device to securely communicate with the first device;
   a second device for receiving the invitation via the communication network, and transmitting a digital identity token over the communication network, wherein the first device receives the digital identity token via the communication network;
   a third-party device for authenticating a communication line between the first device and the second device and issuing a communication line certificate to establish a secure communication line between the first device and the second device.

10. The system of claim 9, wherein the third-party device prevents a new device for which a secure communication line between the first device and the new device has not been established from communicating with the first device such that the first device accepts the communication; and prevents the new device for which a secure communication line between the second device and the new device has not been established from communicating with the second device such that the second device accepts the communication.

11. A system for utilizing a communication line certificate over a computer network comprising:
   a first device for generating a digitally signed request and transmitting the digitally signed request over the computer network, wherein the digitally signed request comprises a first proof of an association of the first device to the communication line; and
   a second device for receiving the digitally signed request from the first device and verifying the first proof to produce a first verification of the association of the first device to the communication line, and for generating a digitally signed acceptance comprising a second proof of an association of the second device to the communication line.

12. The system of claim 11, wherein the first device verifies the second proof to produce a second verification of the association of the second device to the communication line, wherein the first proof is generated using, at least in part, a first private key corresponding to a first public key that is contained within or referenced by the communication line certificate, wherein
   the second proof is generated using, at least in part, a second private key corresponding to a second public key that is contained within or referenced by the communication line certificate, and wherein
   the first verification uses the first public key, and the second verification uses the second public key.

13. The system of claim 11, wherein the first verification comprises a precondition of use by the second device of a first public key that is contained within or referenced by the communication line certificate in establishment of a session key, and wherein the second verification comprises a precondition of use by the first device of a second public key that is contained within or referenced by the communication line certificate in establishment of the session key.

* * * * *

UNITED STATES PATENT AND TRADEMARK OFFICE
CERTIFICATE OF CORRECTION

PATENT NO. : 12,028,466 B2
APPLICATION NO. : 18/224022
DATED : July 2, 2024
INVENTOR(S) : David William Kravitz et al.

It is certified that error appears in the above-identified patent and that said Letters Patent is hereby corrected as shown below:

On the Title Page

On the page 2, in item (60), Column 1, under "Related U.S. Application Data", Line 22, after "9,455,978," insert -- which is a continuation of application No. 14/218,897, filed on Mar. 18, 2014, now Pat. No. 9,270,663, --.

In the Drawings

On sheet 1 of 13, in figure 1, and on the title page, the illustrative print figure, reference numeral 120, Line 1, delete "Programing" and insert -- Programming --.

On sheet 9 of 13, in figure 9, Line 1, delete "IOT" and insert -- IoT --.

On sheet 10 of 13, in figure 10, Line 1, delete "IOT" and insert -- IoT --.

On sheet 10 of 13, in figure 10, reference numeral 1002, Line 1, delete "Programing" and insert -- Programming --.

In the Specification

In Column 1, Line 33, delete "Jul. 2017." and insert -- Jul. 25, 2017. --.

In Column 1, Line 41, delete "Jul. 2017." and insert -- Jul. 25, 2017. --.

Signed and Sealed this
Fifth Day of November, 2024

Katherine Kelly Vidal
*Director of the United States Patent and Trademark Office*